(12) United States Patent
Kurumatani

(10) Patent No.: US 6,876,745 B1
(45) Date of Patent: Apr. 5, 2005

(54) METHOD AND APPARATUS FOR ELLIPTIC CURVE CRYPTOGRAPHY AND RECORDING MEDIUM THEREFORE

(75) Inventor: Hiroyuki Kurumatani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/468,948

(22) Filed: Dec. 22, 1999

(30) Foreign Application Priority Data

Dec. 22, 1998 (JP) .......................................... 10-364277

(51) Int. Cl.$^7$ ............................................. H04L 9/30
(52) U.S. Cl. .......................... 380/28; 380/30; 708/250; 708/400; 708/442
(58) Field of Search ..................... 380/28, 30; 708/250, 708/400, 442

(56) References Cited

U.S. PATENT DOCUMENTS

| | | | | | |
|---|---|---|---|---|---|
| 5,442,707 | A | * | 8/1995 | Miyaji et al. ................ | 380/30 |
| 5,497,423 | A | * | 3/1996 | Miyaji .......................... | 380/30 |
| 6,307,935 | B1 | * | 10/2001 | Crandall et al. .............. | 380/28 |

FOREIGN PATENT DOCUMENTS

| | | |
|---|---|---|
| EP | 0874307 | 10/1998 |
| EP | 1166494 | 1/2002 |

OTHER PUBLICATIONS

Cohen et al, Efficient Elliptic Curve Exponentiation using Mixed Coordinates Advances in Cryptology, Asaicrypt, 1998, pp. 51–65.

Agnew et al, An Implementation of Elliptic Curve Cryptosystems over F2155, IEEE Journal on Selected Areas in Communications, IEEE Inc., vol. 11, No. 5, Jun. 1, 1993, pp. 804–813.

D.V. Chudnovsky, G.V. Chudnovsky "Sequences of Numbers Generated by Addition in Formal Groups and New Primality and Factorization Tests", Advances in Applied Mathematics, 7, 385–434, 1986.

P. Montgomery, "Speeding the Pollard and Elliptic Curve Methods of Factorization", Mathematics of computation vol. 48, No. 177, pp. 243–264 (1987).

IEEE P1363/D2 Standard Specification for Public Key Cryptography (1998).

Henri Cohen, "A Course in Computational Algebraic Number Theory", GTM138, Springer (1993) p. 464 Atkin's Test.

A. Menezes, P. Oorschot, S. Vanstone, "Handbook of Applied Cryptography", CRC Press (1996) Section 4.5.3 Primitive polynomials.

\* cited by examiner

Primary Examiner—Andrew Caldwell
Assistant Examiner—Minh Dieu Nguyen
(74) Attorney, Agent, or Firm—Antonelli, Terry, Stout & Kraus, LLP

(57) ABSTRACT

A method and an apparatus capable of realizing at a high speed an elliptic curve cryptography in a finite field of characteristic 2, in which the elliptic curve is given by $y^2+xy=x^3+ax^2+b$ ($b \neq 0$) and an elliptic curve cryptography method which can protect private key information against leaking from deviation information of processing time to thereby defend a cipher text against a timing attack and a differential power analysis attack are provided. To this end, an arithmetic process for executing scalar multiplication arithmetic $d(x, y)$ a constant number of times per bit of the private key d is adopted. Further, for the scalar multiplication $d(x, y)$, a random number k is generated upon transformation of the affine coordinates $(x, y)$ to the projective coordinates for thereby effectuating the transformation $(x, y) \rightarrow [kx, ky, k]$ or alternatively $(x, y) \rightarrow [k^2x, k^3y, k]$. Thus, object for the arithmetic is varied by the random number (k).

5 Claims, 19 Drawing Sheets

METHOD AND APPARATUS FOR ELLIPTIC CURVE CRYPTOGRAPHY AND RECORDING MEDIUM THEREFORE

BACKGROUND OF THE INVENTION

The present invention relates generally to a technique for ensuring security in a computer network. More particularly, the present invention is concerned with a method of realizing an elliptic curve cryptography (encryption/decryption), an apparatus for carrying out the method and a recording medium for storing the same in the form of a program executable with a computer.

The elliptic curve cryptography (encryption/decryption) is one of the public key cryptology algorithms invented by V. Miller and N. Koblitz independently. As the postulation for the public-key cryptograph technology imposed from the viewpoint of security, discovery of a private key on the basis of the counterpart public key laid open to the general public must be made impossible in practice. On the other hand, the public key cryptosystem requires intrinsically a lot of time for encryption and decryption when compared with the private key cryptosystem. Thus, in the present state of the art, there exists a great demand for a high-speed processing technique for enabling encryption and decryption in the public key cryptosystem. Under the circumstances, as the public key cryptograph technique which can satisfy both requirements for the security and the high-speed processing susceptibility which are, so to say, contradictory to each other, the elliptic curve cryptography which has more competence for dealing with the above problem than the RSA (Rivest, Shamir & Adleman) cryptography and the ElGamal cryptography both known heretofore is now attracting attention.

The elliptic curve cryptograph can be represented by the standard form of an elliptic curve in a finite prime field, i.e., $y^2=x^3+ax+b$ $(4a^3+27b^2\neq0)$ or alternatively by the standard form of an elliptic curve in a finite field of characteristic 2 (which may also be referred to as the extension field of "2"), i.e., $y^2+xy=x^3+ax^2+b$ $(b\neq0)$. By adding a point at infinity to the points on such curve, an Abelian group is made available. In this conjunction, the Abelian group arithmetic will be represented by plus sign (+). Further, in conjunction with the arithmetics for X and Y which differ from each other, "X+Y" will be referred to as the addition arithmetic. Furthermore, "X+X" will be referred to as the doubling arithmetic and represented by "2X".

In order to facilitate computations involved in the elliptic curve cryptography, a point (X, Y) on an elliptic curve in the affine coordinate system may also be expressed in terms of the projective coordinates. At this juncture, let's suppose the projective coordinate system in which $[X, Y, Z]=[\lambda^2 X, \lambda^3 Y, \lambda Z]$ applies valid for a given $\lambda\neq0$. Then, there can be established such correspondences between the affine coordinates and the projective coordinates as mentioned below. Namely, the affine coordinates (x, y) can be represented by the projective coordinates [x, y, 1] while the projective coordinates [X, Y, Z] can be represented by the affine coordinates $(X/(Z)^2, Y/(Z)^3)$. Further, in the projective coordinate system, it applies valid that $-[X, Y, Z]=[X, -Y, Z]$.

In the elliptic curve cryptography, an elliptic curve in a finite field is made use of for making usable a set of points which constitutes a finite field of the elliptic curve. In this conjunction, the order of the elliptic curve is represented by a number of points of the elliptic curve. In the following, the result of addition of "P" s times, i.e., P+P+ . . . +P where the number of "P" is s, will be referred to as the s-multiplied point of "P". When the arithmetic for determining the s-multiplied point of P is represented by "sP", the order of the point "P" on the elliptic curve is given by n=112 which satisfies the conditions that nP=0, $1\leq m<n$ and mP≠0.

The key for the elliptic curve cryptography is composed of an elliptic curve, a base point, a public key and a private key. In more concrete, the key of the elliptic curve cryptograph is composed of coefficients a and b of the elliptic curve, the point P (base point) whose order is a prime number, a finite field element d (private key) and a point Q (public key) given by a product of the base point multiplied by the private key (i.e., Q=dp). Incidentally, it is to be added that the elliptic curve, the base point and the public key are the laid-open information. Further, the public key and the private key assume respective values which differ from one to another user, while the elliptic curve and the base point assume respective values which are common to the users.

In the elliptic curve cryptography, a scalar multiplication (SB) arithmetic for a given point R is adopted for the data encryption, generation of a digital signature and the verification of the digital signature. The scalar multiplication can be realized through combination of the addition arithmetic and the doubling arithmetic mentioned previously. However, computation for each of such addition arithmetic and doubling arithmetic necessarily requires execution of division arithmetic once. In general, division of the finite field takes lots of time. For this reason, efforts have heretofore been paid for establishing such a computation method which can avoid the division arithmetic.

As an approach for evading the division of the finite field, addition arithmetic and doubling arithmetic in the projective space as well as expressions or formulae for realization thereof have already been proposed. For more particulars, reference should be made to D. V. Chudnovsky and G. V. Chudnovsky: "SEQUENCES OF NUMBERS GENERATED BY ADDITION IN FORMAL GROUPS AND NEW PRIMALITY AND FACTORIZATION TESTS", Advances in Applied Mathematics, 7. 385–434, 1986. In this conjunction, it is noted that the computation time taken for the prime field multiplication is ordinarily by far longer than that taken for the prime field addition/subtraction. Thus, the overall computation time or overhead can be evaluated on the basis of the number of arithmetic processes involved in the prime field multiplication. In that case, the addition arithmetic requires execution of the prime field multiplication (inclusive of squaring arithmetic) sixteen times. In the doubling arithmetic, the prime field multiplication has to be performed ten times. For more particulars, reference is to be made to the literature cited above. Further, it is reported that for the coefficient a of the elliptic curve, residual multiplication arithmetic has to be performed eight times in the case where a=−3.

Further, according to the teachings disclosed in P. Montgomery: "SPEEDING THE POLLARD AND ELLIPTIC CURVE METHODS OF FACTORIZATION", Mathematics of Computation Vol. 48, No. 177, pp. 243–264 (1987), it is reported that when the standard form of an elliptic curve in a finite prime field, i.e., $By^2=x^3+Ax^2+Bx$, is employed for addition of points P0(x0, y0) and P1(x1, y1) as given by P3(x3, y3) and subtraction thereof as given by P4(x4, y4), i.e., when P1+P0=P3 and P1−P0=P4, then x3 can be determined speedily from X0, x1, x4. In more concrete, it is reported that x3 can be determined by executing six times the prime field multiplication. Further, in the case where the double point of P1 is given by P5(x5, y5), x5 can be determined only from x1 by performing multiplication five times. By taking advantage of this feature, x-coordinate of scalar multiple (scalar value d) of the point R can be determined from Rx in the manner described below.

Presuming that the initial value is [R, 2R] and that mR represents the x-coordinate of the point R multiplied by m, the scalar value d is exploded or developed to a bit string in the binary notation. Then, starting from the most significant bit of d, it is validated that $[mR, (m+1)R] \rightarrow [2mR, 2(m+1)R]$ for the bit "0" of d, and $[mR, (m+1)R] \rightarrow [(2m+1)R, 2(m+1)R]$ for the bit "1" of d, where $(m+1)R - mR = R$ and $(m+1)R + mR = (2m+1)R$.

In this manner, the scalar multiplication sP can be realized by performing the prime field multiplication (inclusive of squaring) ten times (6+5) for each bit. Hereinafter, the procedure or algorithm described above will be referred to as the Montgomery method.

On the other hand, the standard form of an elliptic curve on the finite field of characteristic 2 (extension field of "2") is given by $y^2 + xy = x^3 + ax^2 + b$ ($b \neq 0$). For such elliptic curve, the scalar multiplication arithmetic can be realized through combination of the addition arithmetic and the doubling arithmetic. Rules for the addition arithmetic and the doubling arithmetic are set forth in IEEE: P1363/D2 "STANDARD SPECIFICATION FOR PUBLIC KEY CRYPTOGRAPHY" (1998). By resorting to the arithmetic in the finite field of characteristic 2 (extension field of "2"), squaring and addition/subtraction can be realized very speedily when compared with mutually different multiplications. Thus, the computation overhead involved in the arithmetics in the finite field of characteristic 2 can be evaluated by the number of times the mutually different multiplications are to be performed. The addition arithmetic requires execution of multiplication fifteen times while the doubling arithmetic requires execution of multiplication five times. However, it should be noted that in the elliptic curve cryptography based on the finite field of characteristic 2, no arithmetic algorithm is known in which the Montgomery method is resorted to.

For the elliptic curve which can ensure security, it is necessary to set parameters a and b which allow the order #E(Fq) of the elliptic curve to have a large prime factor r. In the case where the order #E(Fq) of the elliptic curve is given by kr, the prime factor r can assume a large prime number by selecting a small integer for k. As to the method of setting the parameters of the elliptic curve having a large prime factor r as the order, reference may be made to Henri Cohen: "A COURSE IN COMPUTATIONAL ALGEBRAIC NUMBER THEORY", GTM138, Springer (1993) p. 464, Atkin's Test.

Next, problems of cipher text attack and defense against the attack will be considered. In recent years, trials for attacking the cipher text as well as the measures for defending the cipher text against the attacks have been studied. More specifically, as to the attack on the cipher text, there can be mentioned in addition to the classical or theoretical cryptanalysis a differential power analysis (DPA in short) which tries to decode or decrypt the cipher text by processing statistically waveform representing current consumption, a timing attack trying to decode by analyzing statistically differences in the cipher processing time and others which rely on the analyses of leak information. Of course, the measures for defending the cipher against such attacks have also been developed. However, most of the defense measures have been realized primarily by physically incorporating the defense function in hardware circuit itself destined, for example, for IC cards.

The conventional elliptic curve cryptographies described above suffer problems mentioned below. As is apparent from the foregoing, in the elliptic curve cryptography in the finite field of characteristic 2, there is known no arithmetic in which the Montgomery method is adopted. Further, in the studies concerning the elliptic curve cryptographies, importance has been put primarily on the development of high-speed execution methods and generation of such elliptic curve which can ensure security as viewed from the standpoint of cryptanalysis. By contrast, no efforts have been paid to the development of defense technologies for defending the ciphers against the attack of the leak information analysis type. In the data decryption processing of the elliptic curve cryptology, arithmetic operation for multiplying a point (x, y) on a given elliptic curve by the private key d, i.e., D(x, y), is performed. In that case, deviation information of the private key d may possibly leak, being reflected in the consumed current waveform and the cipher processing time, which will give a clue to the differential power analysis (DPA) attack and the timing attack.

SUMMARY OF THE INVENTION

In the light of the state of the art described above, it is a first object of the present invention to provide an elliptic curve cryptography method which is capable of realizing at a high speed the elliptic curve cryptography in a finite field of characteristic 2 (or extension field of "2"), in which the elliptic curve is given by $y^2 + xy = x^3 + ax^2 + b$ ($b \neq 0$).

With the present invention, it is also contemplated to provide an apparatus for carrying out the method mentioned above.

A second object of the present invention is to provide an elliptic curve cryptography method which can prevent the private key information from leaking in the form of deviation information of the processing time to thereby defend the cipher text against the timing attack and the differential power analysis (DPA) attack in the elliptic curve cryptography.

A third object of the present invention is to provide a recording medium which stores the elliptic curve cryptography method in the form of a program or programs which can be executed with a computer.

In view of the first object mentioned above, there is provided according to an aspect of the present invention a method of realizing an elliptic curve cryptography in a finite field of characteristic 2 (extension field of "2"), in which the elliptic curve is given by $y^2 + xy = x^3 + ax^2 + b$ (where $b \neq 0$) and in which addition of points P1(x1, y1) and P2(x2, y2) on the elliptic curve composed of points defined by individual coordinate components is presumed to be represented by P3(x3, y3) with subtraction of the points P1(x1, y1) and P2(x2, y2) being presumed to be represented by P4(x4, y4). The cryptography method includes a step of inputting the coordinate component x1, a step of transforming the inputted coordinate component x1 into X- and Z-coordinates $[X_1, Z_1]$ of a projective space, a step of storing the coordinates $[X_1, Z_1]$ of the projective space, a step of transforming the coordinate component x2 into coordinates $[X_2, Z_2]$ of the projective space, a step of storing the projective coordinate $[X_2, Z_2]$, a step of transforming the coordinate component x4 into coordinates $[X_4, Z_4]$ of the projective space, a step of storing the projective coordinates $[X_4, Z_4]$, a step of determining projective coordinates $[X_3, Z_3]$ from the stored projective coordinates $[X_1, Z_1]$, $[X_2, Z_2]$ and $[X_4, Z_4]$, a step of transforming the projective coordinates $[X_3, Z_3]$ into the coordinate component x3, and a step of outputting the coordinate component x3, whereby scalar multiplication of the point P1(x1, y1) is determined. Further, in a preferred mode for carrying out the present invention, the aforementioned step of determining the projective coordinates $[X_3, Z_3]$ susceptible to the transformation into the coordinate component x3 from the stored projective coordinates $[X_1, Z_1]$, $[X_2, Z_2]$ and $[X_4, Z_4]$ may include a substep of computing $B=X_1Z_2^2+X_2Z_1^2$, a substep of storing the computed B, a substep of deciding whether or not the stored B satisfies condition that B=0, a substep of outputting a point at infinity when B=0 while arithmetically determining $Z_3=Z_4B$ unless B=0, a substep of storing the determined $Z_3$, and a substep of arithmetically determining $X_3=X_4B^2+X_1X_2Z_1^2Z_2^2Z_4^2$ from the stored $Z_3$.

Further, for achieving the second object mentioned previously, there is provided according to a second aspect of the present invention, an elliptic curve cryptography method which can positively prevent leakage of the private key information from the deviation information of the processing time in a decryption processing of an elliptical curve cipher in the finite field of characteristic 2. In other words, the present invention also provides a method of realizing an elliptic curve cryptography in a finite field of characteristic 2 (extension field of "2"), in which the elliptic curve is given by $y^2+xy=x^3+ax^2+b$ and in which addition of points P1(x1, y1) and P2(x2, y2) on the elliptic curve composed of points defined by individual coordinate components is presumed to be represented by P3(x3, y3) with subtraction of the points P1(x1, y1) and P2(x2, y2) being presumed to be represented by P4(x4, y4), the method including a step of inputting the coordinate component x1, a step of transforming the inputted coordinate component x1 into X- and Z-coordinates $[X_1, Z_1]$ of a projective space, a step of storing the coordinates $[X_1, Z_1]$ of the projective space, a step of transforming the coordinate component x2 into coordinates $[X_2, Z_2]$ of the projective space, a step of storing the projective coordinates $[X_2, Z_2]$, a step of transforming the coordinate component x4 into coordinates $[X_4, Z_4]$ of the projective space, a step of storing the projective coordinates $[X_4, Z_4]$, a step of determining projective coordinates $[X_3, Z_3]$ from the stored projective coordinates $[X_1, Z_1]$, $[X_2, Z_2]$ and $[X_4, Z_4]$, a step of transforming the projective coordinates $[X_3, Z_3]$ into the coordinate component x3, and a step of outputting the coordinate component x3, wherein the cryptography method further includes a step of generating a random number k, a step of storing the generated random number k, and a step of performing arithmetic operation on the individual coordinate components of the projective space and the stored random number k after the transformation of the x-coordinate component to the projective coordinates, to thereby derive projective coordinates $[k^2x, k]$. In other words, the method of varying constantly the object for the arithmetic in the finite field of characteristic 2 (extension field of "2") is provided.

In another preferred mode for carrying out the present invention, the elliptic curve cryptography method may include a step of generating a random number k, a step of storing the generated random number k, and a step of performing arithmetic operation on the individual coordinate components of the projective space and the stored random number k after the transformation of the x-coordinate component to the projective coordinates, to thereby derive projective coordinates [kx, k].

Further, for carrying out the elliptic curve cryptography methods described above, there is provided according to another aspect of the present invention, an arithmetic apparatus for realizing an elliptic curve cryptography in a finite field of characteristic 2 (extension field of "2"), in which the elliptic curve is given by $y^2+xy=x^3+ax^2+b$, which apparatus includes a random number generation module for generating a random number k, a projective coordinate transformation which module receiving as inputs thereto the coordinate x0 in the finite field of characteristic 2 and the random number k to thereby transform the coordinate x0 into projective coordinates $[kx0, k]=[X_1, Z_1]$, a doubling arithmetic module for arithmetically determining a double point from the projective coordinates $[X_1, Z_1]$, an addition arithmetic module for determining an addition point from the projective coordinates $[X_1, Z_1]$, to output the addition point, and a scalar multiplication module which receives as inputs thereto information from the projective coordinate transformation module, the doubling arithmetic module and the addition arithmetic module to thereby determine scalar multiplication of the coordinate component x0.

Furthermore, in view of the third object mentioned previously, there is provided according to a further aspect of the present invention a recording medium which stores therein a cryptography method of realizing an elliptic curve cryptography in a finite field of characteristic 2 (extension field of "2"), in which the elliptic curve is given by $y^2+xy=x^3+ax^2+b$ and in which addition of points P1(x1, y1) and P2(x2, y2) on the elliptic curve composed of points defined by individual coordinate components is presumed to be represented by P3(x3, y3) with subtraction of the points P1(x1, y1) and P2(x2, y2) being presumed to be represented by P4(x4, y4), the program comprising a step of inputting the coordinate component x1, a step of transforming the inputted coordinate component x1 into X- and Z-coordinates $[X_1, Z_1]$ of a projective space, a step of storing the coordinates $[X_1, Z_1]$ of the projective space, a step of transforming the coordinate component x2 into coordinates $[X_2, Z_2]$ of the projective space, a step of storing the projective coordinates $[X_2, Z_2]$, a step of transforming the coordinate component x4 into coordinates $[X_4, Z_4]$ of the projective space, a step of storing the projective coordinates $[X_4, Z_4]$, a step of determining projective coordinates $[X_3, Z_3]$ from the stored projective coordinates $[X_1, Z_1]$, $[X_2, Z_2]$ and $[X_4, Z_4]$, a step of transforming the projective coordinates $[X_3, Z_3]$ into the coordinate component x3, and a step of outputting the coordinate component x3, whereby scalar multiplication of the point P1(x1, y1) is determined.

The method of realizing the elliptic curve cryptography in the finite field of characteristic 2 mentioned previously can effectively be employed as the measures for preventing leakage of the private key information from the deviation information of the processing time for decrypting an elliptic curve cipher text on a prime field. To this end, according to still further aspect of the present invention, there may be adopted a combination of the arithmetics (a) and (b) mentioned below.

(a) In the case where the standard form of an elliptic curve in a prime field is given by $By^2=x^3+Ax^2+Bx$, the scalar multiplication algorithm according to the Montgomery method is adopted for determining the scalar multiplication d(x, y) of the elliptic curve.

(b) In conjunction with computation for scalar multiplication d(x, y), a random number k is generated upon transformation of the affine coordinates (x, y) into the projective coordinates for thereby effectuate the transformation $(x, y) \rightarrow [kx, ky, k]$ or $(x, y) \rightarrow [k^2x, k^3y, k]$.

By virtue of the method mentioned above, the object for arithmetic in the prime field can constantly be varied by the random number.

Other objects, features and advantages of the present invention will become apparent from the following detailed description of the preferred or exemplary embodiments taken in conjunction with the accompanying drawings.

BRIEF DESCRIPTION OF THE DRAWINGS

In the course of the description which follows, reference is made to the drawings, in which.

DESCRIPTION OF THE EMBODIMENTS

Now, the present invention will be described in detail in conjunction with what is presently considered as preferred or typical embodiments thereof by reference to the drawings.

General Description

First mentioned below are arithmetic algorithm or rules for an elliptic curve of the standard form $y^2+xy=x^3+ax^2+b$ ($b \neq 0$) in a finite field of characteristic 2 of the affine coordinate system.

1) $0+0=0$
2) $(x, y)+0=(x, y)$
3) $(x, y)+(x, x+y)=0$
4) Commutativity $$(x0, y0)+(x1, y1)=(x1, y1)+(x0, y0)$$

5) Addition arithmetic $$(x2, y2)=(x1, y1)+(x0, y0)$$

$$x2=a+\lambda^2+\lambda+x0+x1;\ y2=\lambda(x1+x2)+x2+y1;$$

$$\lambda=(y0+y1)/(x0+x1)$$

6) Doubling arithmetic $$(x2, y2)=(x1, y1)+(x1, y1)=2(x1, y1)$$

$$x2=a+\lambda^2+\lambda;\ y2=\lambda(x1+x2)+x2+y1;\ \lambda=x1+(y1/x1)\ \text{or}\ x2=(x1)^2+b/(x1)^2$$

In order to facilitate the computation for the elliptic curve such as mentioned above, points (X, Y) on the elliptic curve in the affine coordinate system may be transformed to the points expressed in terms of the projective coordinates. At this juncture, let's suppose such projective coordinate system in which $[X, Y, Z]=[\lambda^2 X, \lambda^3 Y, \lambda Z]$ applies valid for a given $\lambda \neq 0$. Then, correspondence can be established between the affine coordinates and the projective coordinates as mentioned below. Namely, the affine coordinates (x, y) can be expressed by the projective coordinates [x, y, 1] while the projective coordinates [X, Y, Z] can be expressed by the affine coordinates $(X/(Z)^2, Y/(Z)^3)$. Further, in the projective coordinate system, it applies valid that $-[X, Y, Z]=[X, XZ+Y, Z]$.

Now, the concept underlying the present invention will be described by reference to the drawings.

Figure 10:
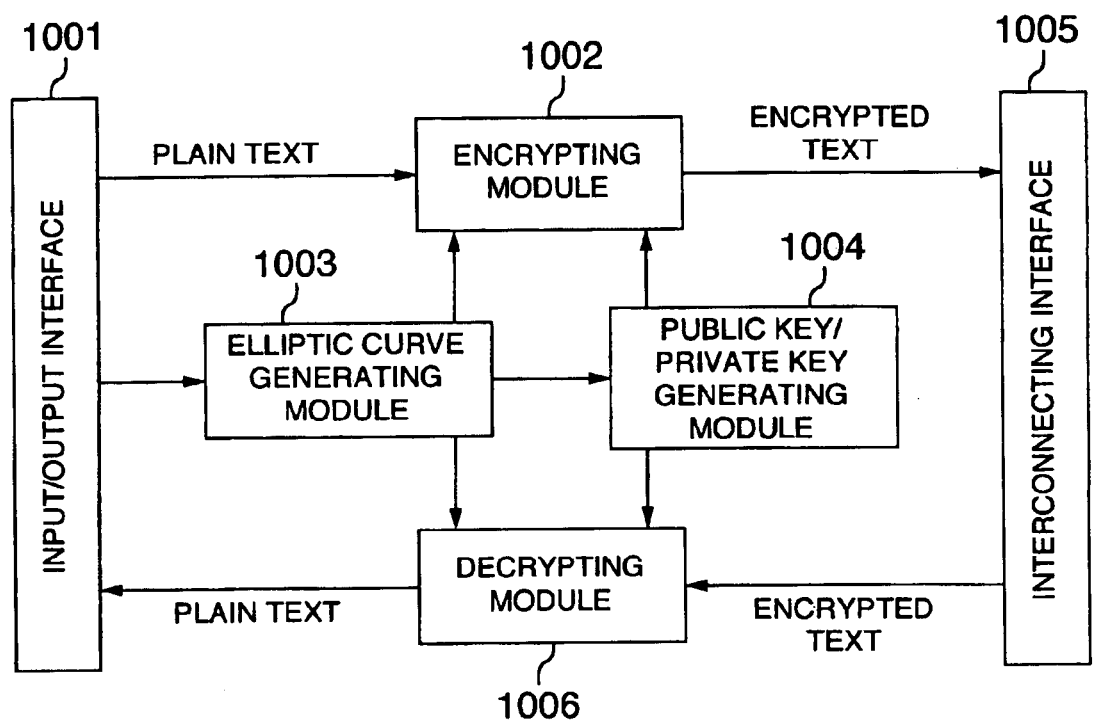
FIG. 10 is a block diagram showing a general configuration of an elliptic curve cryptograph system to which the present invention can be applied.

FIG. 10 is a block diagram showing a general configuration of an elliptic curve encryption system to which the present invention can be applied. Referring to the figure, reference numeral 1001 denotes an input/output interface for an input device such as a keyboard and/or the like for inputting plain texts to be encrypted and for an output device such a display, a printer and/or the like for outputting plain texts resulting from descryption. The interface 1001 may include a storage unit such as a memory or the like for storing the plain text. For encrypting the plain text as inputted through the input/output interface, there is provided an encrypting module 1002 which is so designed as to receive as the inputs thereto an elliptic curve generated by an elliptic curve generating module 1003 and keys from a public key/private key generating module 1004. At this juncture, it is to be mentioned that the public key and the encryption key are combined in a pair, wherein which of these keys is to be made available for the encrypting module 1002 or the decrypting module 1006 depends on the practical application for which the cryptography system is employed, i.e., whether the cryptography system is employed, for example, for the privacy communication or for the signature/authentication communication. The cipher text resulting from the encryption is sent out through the medium of an interconnection interface 1005. The decrypting module 1006 is designed to decrypt the cipher text into a plain text.

Figure 1:
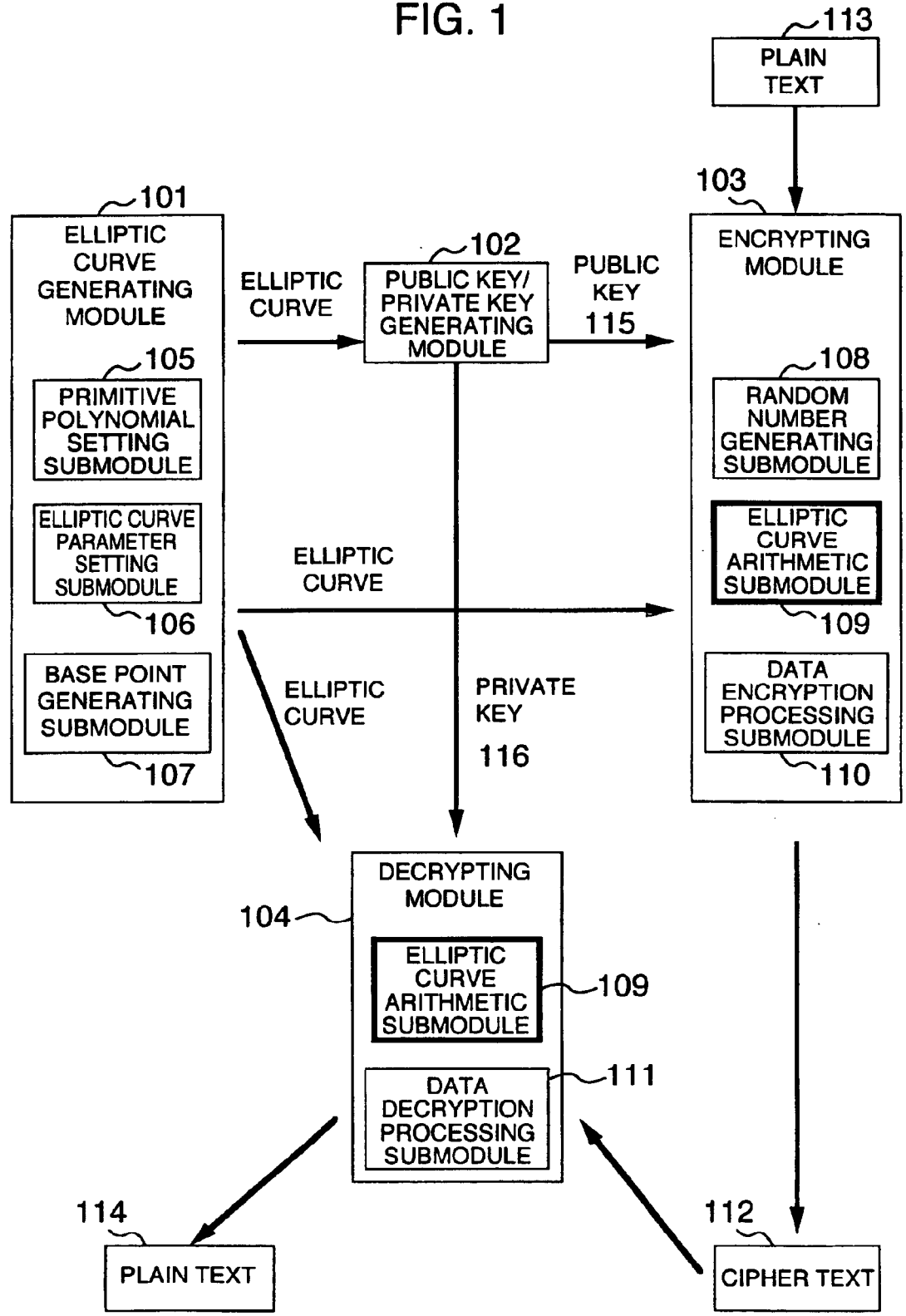
FIG. 1 is a functional block diagram for illustrating processing flows in an elliptic curve cryptograph system according to an embodiment of the present invention.

FIG. 1 is a functional block diagram for illustrating processing flows in an elliptic curve encryption system according to an embodiment of the present invention.

Incidentally, it should be mentioned that the elliptic curve encryption system according to the present invention may be provided in the form of software programmed for executing the elliptic curve cryptography. In that case, the software may be installed in an appropriate information processing apparatus from a recording medium such as a CD-ROM, FD or the like. Referring to FIG. 1, the elliptic curve used for the elliptic curve cryptography is generated by the elliptic curve generating module designated by 101 in this figure. The elliptic curve generated by the elliptic curve generating module 101 is inputted to the public key/private key generating module 102 which responds thereto by generating a public key 115 and a private key 116 on the basis of the elliptic curve as inputted. The encrypting module 103 receives as inputs thereto data of the plain text 113, the public key 115 and the elliptic curve to thereby output a cipher text 112. On the other hand, the decrypting module 104 is designed to receive as inputs thereto the cipher text 112, the private key 116 and the elliptic curve to thereby output a plain text 114. Needless to say, the plain text 114 outputted from the decrypting module 104 is same as the plain text 113 mentioned previously.

The elliptic curve generating module 101 is designed to generate the elliptic curve in accordance with a processing procedure described below. Through a primitive polynomial setting process or submodule 105, a primitive polynomial $f(x)$ in a prime field $F_2$ is set. Such primitive polynomial in the prime field $F_2$ is described, for example, in A. Menezes, P. Oorschot and S. Vanstone: "HANDBOOK OF APPLIED CRYPTOGRAPHY", CRC Press, Section 4.5.3 Primitive Polynomials (1996).

In an elliptic curve parameter setting step or submodule 106, parameters a and b for the elliptic curve $y^2+xy=x^3+ax^2+b$ defined on the basis of a finite field Fq of characteristic 2 (which may also be referred to as the extension field of "2") are set. For the elliptic curve which can ensure security, it is necessary that the order #E(Fq) of the elliptic curve has a large prime factor r. In the case where #E(Fq)=kr applies valid, the prime factor r can assume a large prime number by selecting a small integer for k. Parenthetically, concerning the method of generating an elliptic curve having a large prime factor r as the order, reference may be made to Henri Cohen: "A COURSE IN COMPUTATIONAL ALGEBRAIC NUMBER THEORY", GTM138, Springer (1993) p. 464, Atkin's Test. At this juncture, it should however be mentioned that the elliptic-curve primitive polynomial setting method can equally be realized by resorting to other elliptic curve the order of which has a large prime factor.

A base point generating submodule 107 is designed to determine a generator of a cycling subgroup having the prime factor r mentioned above as the order in the Abelian group on the elliptic curve. By way of example, in the case where #E(Fq)=kr applies valid, a given point (x1, y1) on the elliptic curve E(Fq) in the finite field of characteristic 2 is determined in a first step. Subsequently, in a second step, G=(x1, y1) is set as the base point on the conditions that r(x1, y1)=0 and when k(x1, y1)≠0. Otherwise, the first step mentioned just above is resumed.

At this juncture, it is to be noted that the expression r(x1, y1) means execution of the scalar multiplication (multiplication by r or r-multiplication) for the point (x1, y1). Incidentally, the arithmetic for the scalar multiplication (r-multiplication) will be elucidated later on in conjunction with the elliptic curve arithmetic submodule 109.

Through the procedure described above, the primitive polynomial f(x), the parameters a and b of the elliptic curve $y^2+xy=x^3+ax^2+b$, the base point G and the order r of the base point have been generated which are the information destined to be laid open for the general public.

The public key/private key generating module 102 is designed to generate the public key and the private key in accordance with the procedure described below. On the presumption that the primitive polynomial f(x), the parameters a and b of the elliptic curve $y^2+xy=x^3+ax^2+b$ and the base point G are inputted to the public key/private key generating module 102 and that a public key Q and a private key d are outputted therefrom, a random number which satisfies the condition that 2<d<r−1 is generated in a first step, whereon the public key Q=dG, i.e., a scalar multiplication (d-multiplication) of the base point G is determined.

The public key is the information to be laid open to the general public while the private key represents the information to be secreted. The problem of determining the private key d on the basis of the public key Q and the base point G is what is known as the discrete logarithm problem and requires for the solution thereof such an amount of computation which is on the exponential order of bit-length of the base point on the elliptic curve. Consequently, in case the order r is a large prime number, e.g. when the prime factor r is greater than the 159-th power of "2", it is the impossible in practice to determine the private key d from the public key Q and the base point G. This is the principle underlying the elliptic curve cryptography. In this conjunction, the method of arithmetically determining the public key Q is known in the art, as disclosed, for example, in D. V. Chudnovsky and G. V. Chudnovsky: "SEQUENCES OF NUMBERS GENERATED BY ADDITION IN FORMAL GROUPS AND NEW PRIMALITY AND FACTORIZATION TESTS", Advances in Applied Mathematics, 7. 385–434, 1986.

In the encrypting module 103, the plain text 113 is translated to the cipher text 112 in accordance with the procedure which will be described below. On the presumption that a plain text M, the public key Q, the primitive polynomial f(x), the parameter b of the elliptic curve $y^2+xy=x^3+ax^2+b$ and the base point G are inputted to the encrypting module 103 and that a cipher text C is outputted therefrom, a random number k is generated in a first step by the random number generating submodule 108, whereon in the second step, the base point G and the random number k generated in the first step undergo arithmetic operation for determining kG, i.e., (kx1, ky1), in the elliptic curve arithmetic submodule 109. In a third step, the public key Q and the random number k generated in the first step undergo arithmetic operation for determining kQ, i.e., (kx2, ky2) in the elliptic curve arithmetic submodule 109. In a fourth step, arithmetic operation M x or x2 is executed in the data encryption processing submodule 110, the result of which is set as M'. In a fifth step, arithmetic operation x1‖y1‖M' is executed, as a result of which the cipher text C is outputted from the data encryption submodule 110.

The elliptic curve arithmetic submodule 109 is designed to execute a scalar multiplication (kR) arithmetic for a given point R to thereby determine the x-coordinate. Owing to such arrangement, the private key information can be protected against leakage from deviation (difference) information of the processing time or period for the decryption of the elliptic curve cipher text in the finite field of characteristic 2. In the following, the scalar multiplication method will be elucidated.

Scalar Multiplication Method According to First Embodiment

Figure 2:
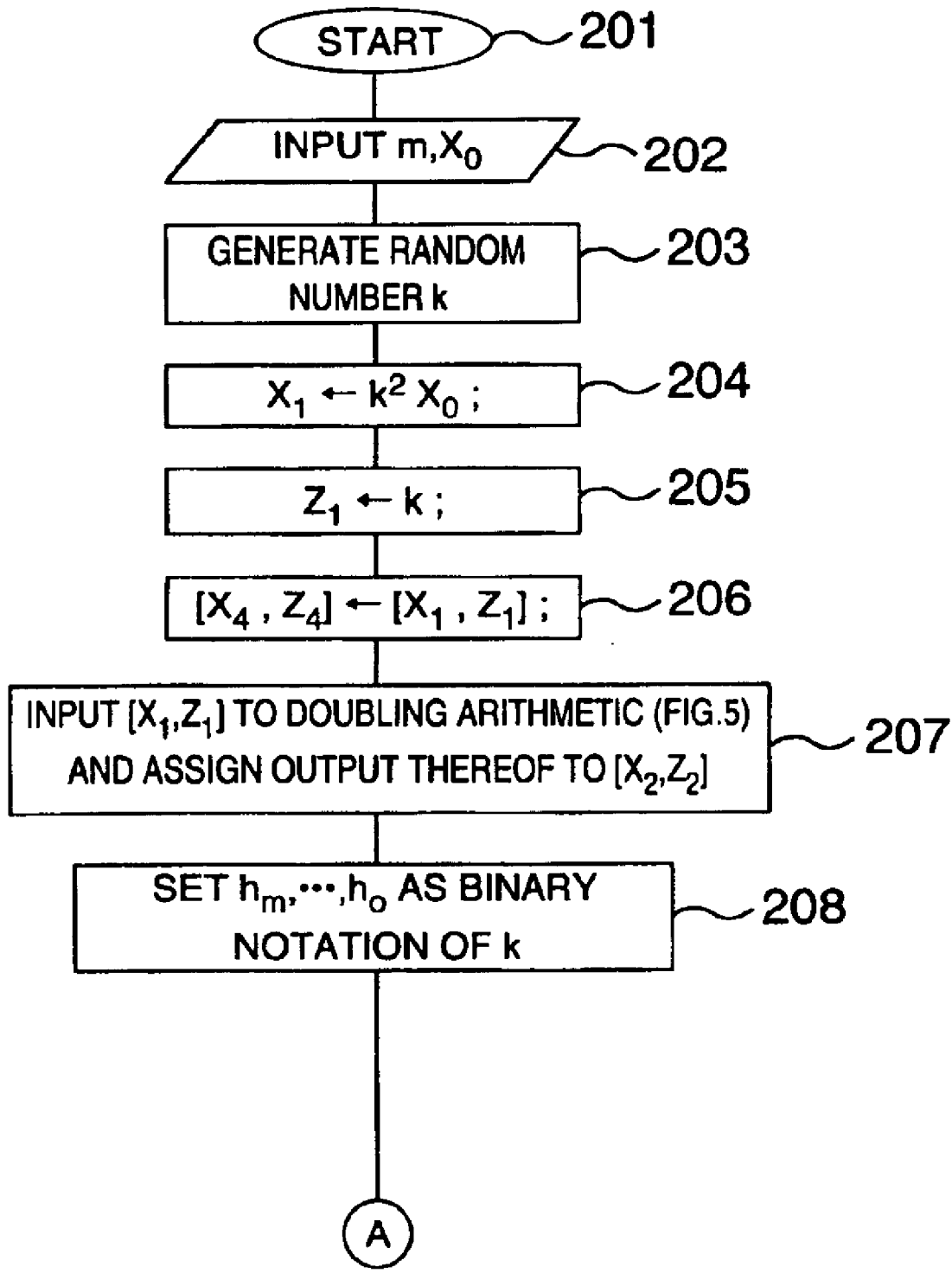
FIG. 2 is a flow chart for illustrating a part of a scalar multiplication procedure adopted in the elliptic curve cryptography according to a first embodiment of the present invention.
Figure 3:
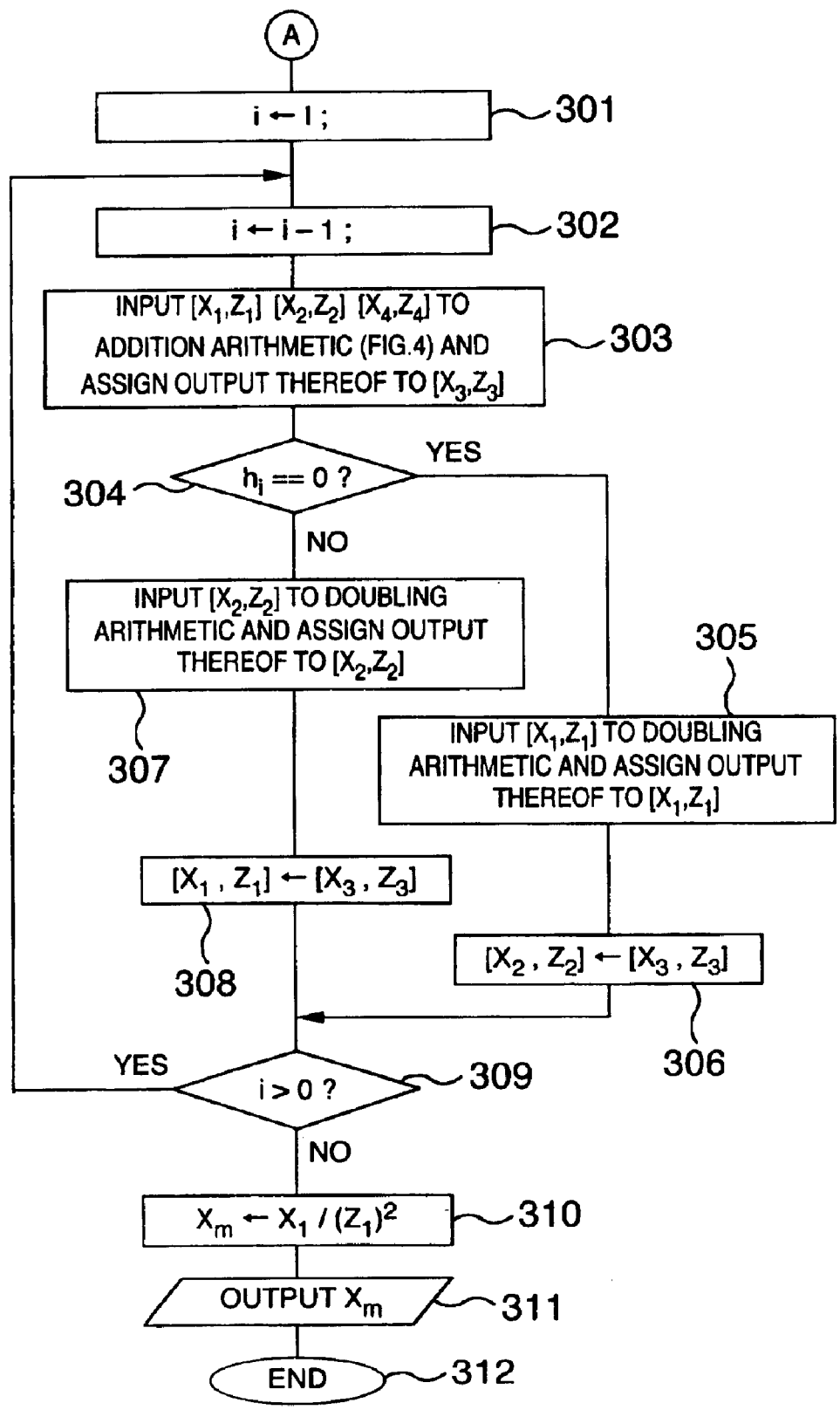
FIG. 3 is a flow chart for illustrating the other part of the scalar multiplication procedure mentioned just above.

FIGS. 2 and 3 in combination illustrate in a flow chart the scalar multiplication method according to a first embodiment of the present invention.

In FIG. 2, the processing starts at step 201. It is presumed that a projective coordinate component $X_0$ of the x-coordinate of a given point R and a scalar value m are inputted and that a projective coordinate component $X_m$ of the x-coordinate of a point corresponding to m-multiple of R is to be outputted. On this assumption, the scalar value m and the projective coordinate component $X_0$ of the x-coordinate are inputted (step 202). In the succeeding steps 203 to 205, data stirring is performed by multiplying the individual projective coordinates by the random number. More specifically, the random number k is generated in the step 203, whereon $k^2 X_0$ is arithmetically determined by multiplying the projective coordinate component $X_0$ by the random number k and assigned to $X_1$ in the step 204 while the random number k itself is assigned to $Z_1$ in the step 205. In succeeding steps 206 to 208 and 301, preparation is made for the scalar multiplication. In more concrete, $[X_1, Z_1]$ is assigned to $[X_4, Z_4]$ in the step 206, being followed by the step 206 where $[X_1, Z_1]$ is inputted to the doubling process (illustrated in FIG. 5), the output of which is then assigned to $[X_2, Z_2]$ in the step 207. Further, in a step 208, the scalar value m is transformed to a binary bit string $h_i h_{i-1} \ldots h_0$, where the most significant bit $h_1$ is "1" and thus "1" is assigned to i in a step 301 shown in FIG. 3. Through processing steps 302 to 309 (see FIG. 3), the addition method and the doubling method are controlled in dependence on whether one bit of the scalar value m is "0" or "1" to thereby realize the scalar multiplication. More specifically, "i-1" is assigned to i in the step 302, which is followed by the step 303 where $[X_1, Z_1]$, $[X_2, Z_2]$ and $[X_4, Z_4]$ are inputted to the addition process (illustrated in FIG. 4), the output of which is assigned to $[X_3, Z_3]$ in the step 303. At this juncture, when $h_i==0$ (i.e., when the step 304 results in affirmation "Yes"), the processing proceeds to the step 305 while it proceeds to the step 307 when $h_i==1$, i.e., when the decision step 304 results in negation "No". In the step 305, $[X_1, Z_1]$ is inputted to the doubling arithmetic or process (FIG. 5), the output from which is assigned to $[X_1, Z_1]$. In the step 306, $[X_3, Z_3]$ is assigned to $[X_2, Z_2]$, whereon the processing proceeds to the step 309. On the other hand, when the decision step 304 results in "No", $[X_2, Z_2]$ is inputted to the doubling arithmetic or process illustrated in FIG. 5, the output of which is assigned to $[X_2, Z_2]$ (step 307). In the step 308, $[X_3, Z_3]$ is assigned to $[X_1, Z_1]$, whereupon the processing proceeds to the step 309. In the case where i>0, i.e., the step 309 results in "Yes", when the step 302 is resumed. If otherwise, i.e., when the decision step 309 results in "No", the processing proceeds to a step 310. Subsequently, the projective coordinates are transformed to the x-coordinate of the (x, y) coordinate system. Finally $X_1/(Z_1)^2$ is assigned to the projective coordinate component $X_m$ (step 310) to be ultimately outputted (step 311). The processing ends at step 312.

Next, description will be directed to the addition method or arithmetic. It is presumed that as the projective space coordinates of a point on the elliptic curve, it applies valid that $[X, Y, Z]=[\lambda^2 x, \lambda^3 Y, \lambda Z]$ for a given $\lambda \neq 0$. At this juncture, let's consider the points $P0=(x0, y0)=[X_0, Y_0, Z_0]$ and $P1=(x1, y1)=[X_1, Y_1, Z_1]$ as the points on the elliptic curve. Additionally, it is presumed that the sum of the points P0 and P1 and the difference therebetween are given by $P3=(x3, y3)=[X_3, Y_3, Z_3]$ and $P4=(x4, y4)=[X_4, Y_4, Z_4]$, respectively.

Expressing mathematically, $P1+P0=P3,$ $P1-P0=P4,$ $x3 = a+(\lambda_3)^2+\lambda_3+x0+x1; \quad \lambda_3=(y0+y1)/(x0+x1),$ $x4 = a+(\lambda_4)^2+\lambda_4+x0+x1; \quad \lambda_4=(x0+y0+y1)/(x0+x1),$ $\lambda_3 + \lambda_4 = (x0)/(x0+x1),$ $(\lambda_3)^2 + (\lambda_4)^2 = (x0)^2/(x0+x1)^2, \quad \text{and}$ $x3 + x4 = ((x0)^2 + (x0)(x0+x1))/(x0+x1)^2$ $\qquad = (x0 x1)/(x0+x1)^2.$ From the above, the following relation can be derived.

$$x3+x4=(x0\ x1)/(x0+x1)^2 \qquad (1)$$

Subsequently, relations in the projective coordinate system are derived.

Replacing "x1" and "x0" in the expression (1) by "$x1=X_1/(Z_1)^2$" and "$x0=X_0/(Z_0)^2$", respectively, then $$X_3/(Z_3)^2 = X_4/(Z_4)^2 + ((X_0/(Z_0)^2)(X_1/(Z_1)^2))/(X_0/(Z_0)^2 + X_1/(Z_1)^2)^2$$

$$= X_4/(Z_4)^2 + ((X_0(Z_0)^2)(X_1(Z_1)^2))/(X_0(Z_1)^2 + X_1(Z_0)^2)^2$$

$$= ((X_4 \beta^2) + Z_4^2(X_0 Z_0^2)(X_1 Z_1^2))/(Z_4^2 \beta^2)$$

where $\beta = X_0 Z_1^2 + X_1 Z_0^2$.

From the above expression, there can be derived:

$$X_3 = X_4 \beta^2 + Z_4^2 (X_0 Z_1^2)(X_1 Z_0^2) \qquad (2)$$

$$Z_3 = Z_4 \beta \qquad (3)$$

On the presumption that $mR=[X_1, Y_1, Z_1]$, $(m+1)R=[X_2, Y_2, Z_2]$, $R=[X_4, Y_4, Z_4]$ and $(2m+1)R=[X_3, Y_3, Z_3]$, the addition arithmetic will be elucidated below.

Addition Method According to First Embodiment

Figure 4:
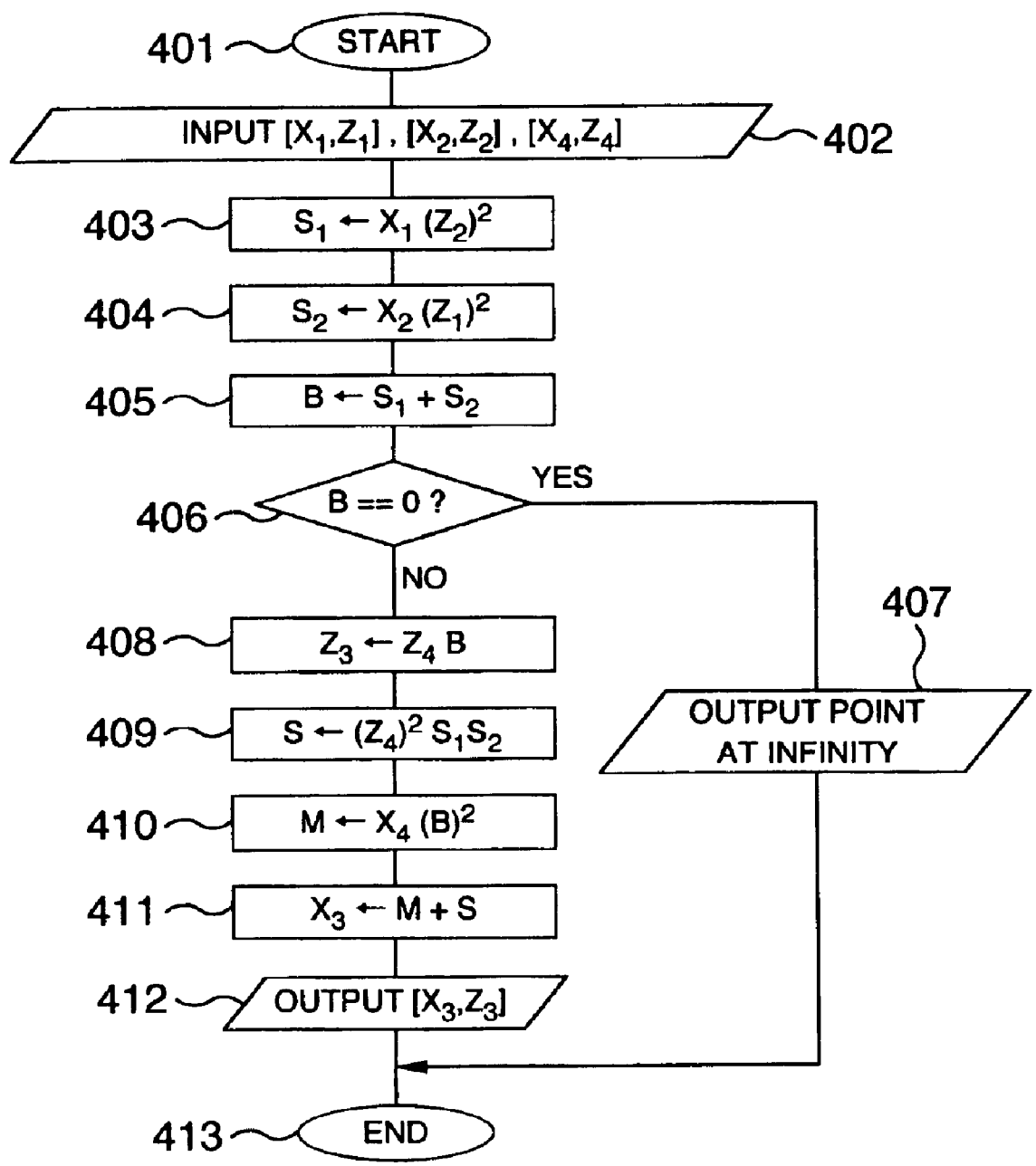
FIG. 4 is a flow chart for illustrating an addition procedure adopted in the elliptic curve cryptography according to the first embodiment of the present invention.

FIG. 4 is a flow chart for illustrating the addition method according to the first embodiment of the present invention. Processing starts at step 401. The projective coordinates $[X_1, Z_1]$, $[X_2, Z_2]$ and $[X_4, Z_4]$ are inputted, whereby coordinates $[X_3, Z_3]$ or a point at infinity is outputted. Thus, the projective coordinates $[X_1, Z_1]$, $[X_2, Z_2]$ and $[X_4, Z_4]$ are inputted in a step 402. Through processings in steps 403 to 407, $X_1(Z_2)^2+X_2(Z_1)^2$ is determined for making decision whether or not the result of the addition arithmetic represents the point at infinity. Interim results $S_1$, $S_2$ and B provide preparation for the realization of the expressions (2) and (3) mentioned above. More specifically, $X_1(Z_2)^2$ is assigned to $S_1$ in the step 403 and $X_2(Z_1)^2$ is assigned to $S_2$ in the step 404 whereupon $S_1+S_2$ is assigned to B in the step 405. When B==0 in the step 406 (i.e., when the decision step 406 results in "Yes"), the processing proceeds to the step 407. If otherwise (i.e., when the decision in the step 406 results in "No"), the processing proceeds to the step 408. In the step 407, the point at infinity is outputted, whereon the processing comes to an end (step 413). Through the processing steps 408 to 411 executed when the decision step 406 results in "No", the coordinates $[X_3, Z_3]$ are determined in accordance with the expressions (2) and (3) mentioned hereinbefore. In more concrete, $Z_4 B$ is assigned to $Z_3$ in the step 408 and $(Z_4)^2 S_1 S_2$ is assigned to S in the step 408 with $X_4 B^2$ being assigned to M in the step 410, whereupon M+S is assigned to $X_3$ in the step 411, and $[X_3, Z_3]$ is outputted in the step 412. Through the procedure described above, the addition arithmetic can be realized sextuple multiplications of the mutually different variables. In other words, $X_3$ can be arithmetically determined from $X_1$, $X_2$ and $X_4$ at a high speed. The process ends at step 413.

Next, description will turn to the doubling method. Let's represent a double point of the point P1 by P2 and presume that $P1=(x1, y1)=[X_1, Y_1, Z_1]$, and that $P2=(x2, y2)=[X_2, Y_2, Z_2]$. The doubling expression is given by $x2=(x1)^2+b/(x1)^2$. Accordingly, by placing $x1=X_1/(Z_1)^2$ and $x2=X_2/(Z_2)^2$ in the doubling expression as follows, $$X_2/(Z_2)^2 = (X_1/(Z_1)^2)^2 + b/(X_1/(Z_1)^2)^2$$
$$= X_1^2/(Z_1)^4 + (b(Z_1)^4)/(X_1)^2$$
$$= (X_1^4 + b(Z_1)^8)/(X_1^2 Z_1^4)$$

there can be derived the following relations.

$$X_2 = X_1^4 + bZ_1^8 \quad (4)$$
$$Z_2 = X_1 Z_1^2 \quad (5)$$

The doubling method based on the expressions mentioned above will be described.

Doubling Method According to First Embodiment

Figure 5:
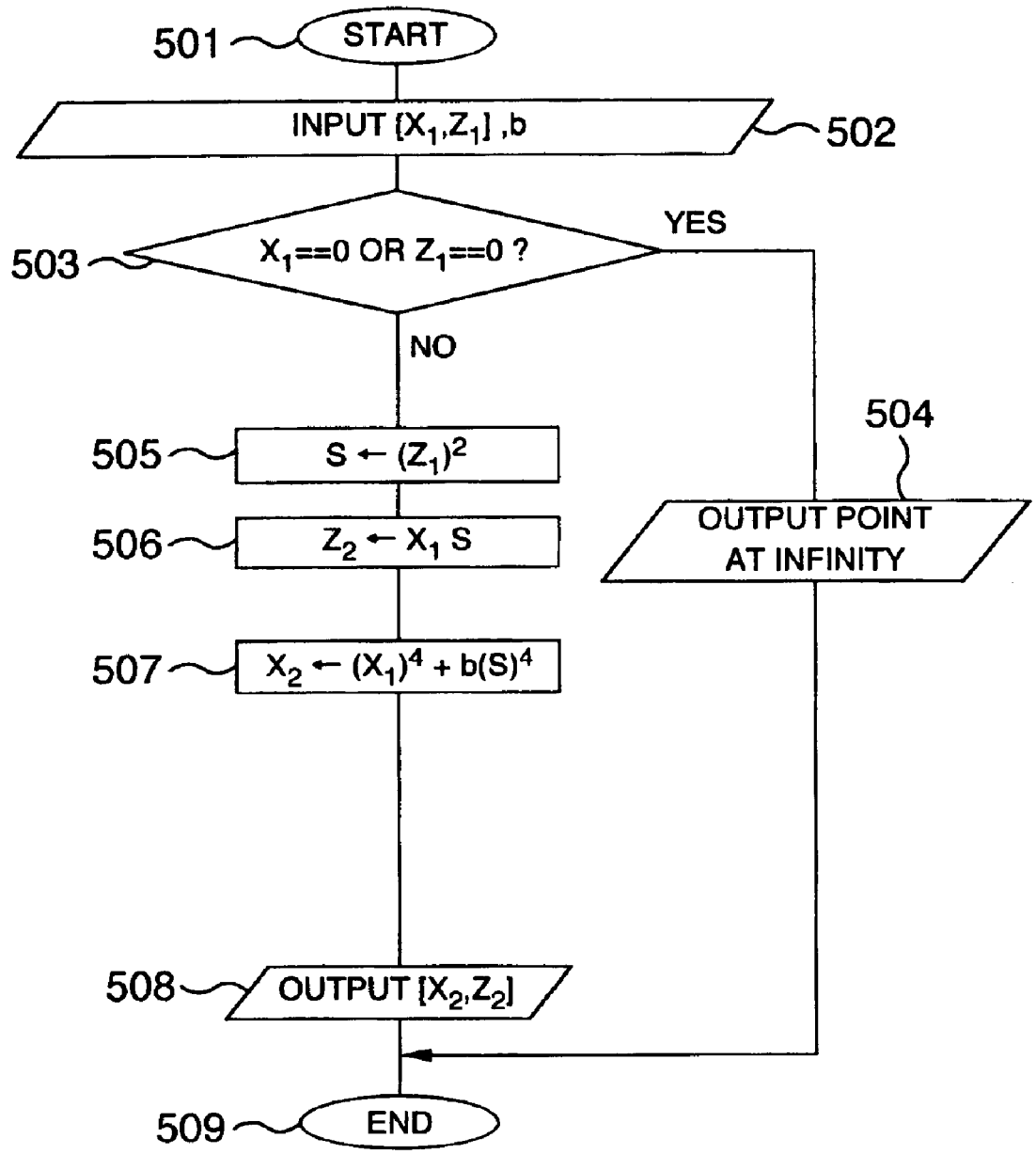
FIG. 5 is a flow chart for illustrating a doubling arithmetic procedure adopted in the elliptic curve cryptography according to the first embodiment of the present invention.

FIG. 5 is a flowchart for illustrating the doubling method according to the first embodiment of the present invention. Referring to the figure, step 501 denotes start. It is presumed that $Q=[X_1, Z_1]$ and b are inputted, whereby $2Q=[X_2, Z_2]$ or alternatively the point at infinity is to be outputted. In a step 502, $X_1$ and $Z_1$ are inputted. In the succeeding steps 503 and 504, decision is made whether or not $X_1==0$ or $Z_1==0$ is valid in order to make decision as to whether the doubling arithmetic results in the point at infinity. Namely, when $X_1==0$ or $Z_1==0$ in the step 503 (i.e., when the decision step 503 results in "Yes"), the processing step proceeds to the step 504. If otherwise (i.e., when the decision step 503 results in "No"), the processing proceeds to a step 505. In the step 504, the point at infinity is outputted. In the succeeding steps 505 to 507, the coordinates $[X_2, Z_2]$ are determined in accordance with expressions (4) and (5) mentioned previously. More specifically, in the step 505, $Z_1^2$ is assigned to S. In the step 506, $X_1 S$ is assigned to $Z_2$. In the step 507, $X_1^4+b(S)^4$ is assigned to $X_2$ (step 507). In the step 508, the coordinates $[X_2, Z_2]$ are outputted. Through the procedure described above, the addition arithmetic can be realized by executing twice the multiplication of mutually different variables. Accordingly, in the scalar multiplication method, the addition arithmetic can be realized by executing (6+2= 8)–times the multiplication of mutually different variables per bit of the scalar value d. In other words, the projective coordinate $X_3$ can be arithmetically determined very speedily from $X_1$, $X_2$ and $X_4$. The process ends at step 509.

Now turning back to FIG. 1, the decrypting module 104 is designed to transform the cipher text 112 into the original plain text 114 through the procedure described below. Of course, the cipher text 112 and the plain text 114 are same with regard to the content. On the presumption that the cipher text C←x1∥y1∥M', private key d, primitive polynomial f(x), parameter b of the elliptic curve $y^2+xy=x^3+ax^2+b$ and the base point G are inputted, whereby the plain text M is outputted, the following steps are executed.

step 1: (x2, y2)←d(x1, y1) (by the data decryption processing submodule 111)

step 2: plain text M←M' x or x2

The step 1 can be executed in accordance with the procedure described hereinbefore by reference to FIGS. 2 and 3.

Through the procedure described above, determination of the x-coordinate equivalent to the scalar (d) multiplication of given coordinates (x, y) can be realized by executing eight-tuple mutually different multiplication processings for each bit of d independent of the bit pattern thereof. Furthermore, by setting for the given x-coordinate of d as the initial value for the scalar multiplications $[kx^2, k]$ where k represents a random number, object for the arithmetic can constantly be varied. Additionally, owing to combination of the procedures described in the foregoing, no bit pattern of d can make appearance in the deviation (difference) of the d(x, y)-processing time, which in turn means that any private key information can be protected against leakage in terms of the deviation information of the d(x, y)-processing time. In addition, this feature indicates that in the DPA (Differential Power Analysis) for realizing the cryptanalysis by making use of deviations of current, voltage, electric power for the encryption processing as well, the private key information is protected against leakage in terms of the deviation information of the current, voltage or electric power for the d(x, y) processing.

Next, description will be made of a second embodiment of the invention which can further speed up the arithmetic operations involved in the elliptic curve cryptography when compared with the first embodiment described above. Representing the coordinate transformation from the affine coordinates to the projective coordinates by (x, y)→[x, y, 1], it can apply valid that $Z_4=1$. By placing $Z_4=1$ in the expressions (2) and (3), there can be derived the following expressions:

$$X_3=(X_4\beta^2)+(X_0(Z_1)^2)(X_0(Z_1)^2) \quad (6)$$
$$Z_3=\beta \quad (7)$$

By making use of the above expressions, the scalar multiplication method and the addition method can be carried out in the manners described below.

Scalar Multiplication Method According to Second Embodiment

Figure 6:
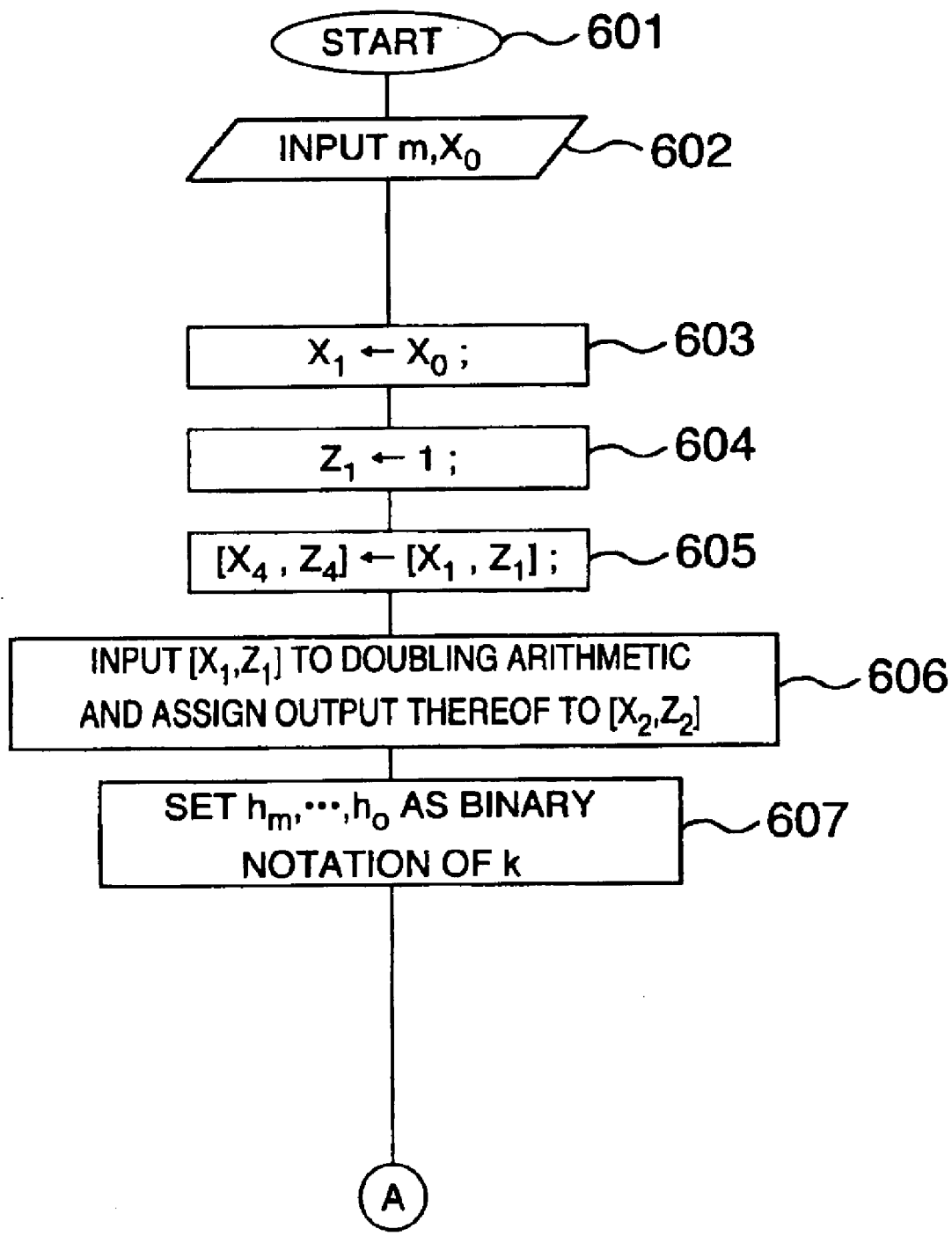
FIG. 6 is a flow chart for illustrating a part of a scalar multiplication procedure in the elliptic curve cryptography according to a second embodiment of the present invention.
Figure 7:
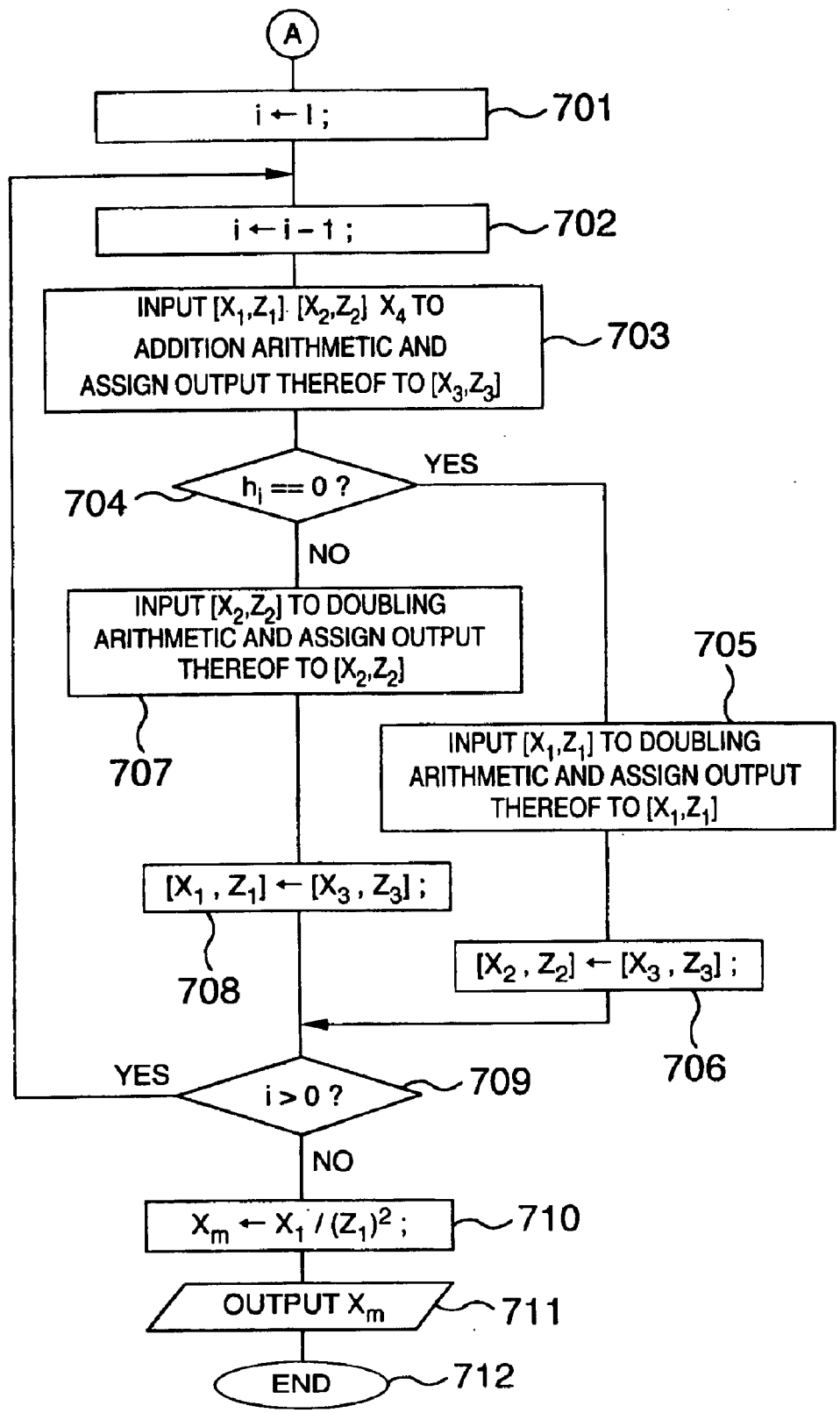
FIG. 7 is a flow chart for illustrating the other part of the procedure mentioned just above.

FIGS. 6 and 7 in combination illustrate in a flow chart, a processing procedure for the scalar multiplication method according to the second embodiment of the present invention. The process begins at step 601. It is presumed that a projective coordinate component $X_0$ of the x-coordinate of a given point R and a scalar value m are inputted for thereby outputting a projective coordinate component $X_m$ of the x-coordinate of a point corresponding to the m-multiplication or m-tuple of R. To this end, the scalar value m and the projective coordinate component $X_0$ of the x-coordinate are inputted in the step 602. In the succeeding steps 603 and 604, transformation of $X_0$ to the projective coordinate is performed. More specifically, in the step 603, $X_0$ is assigned to $X_1$. In the step 604, "1" is assigned to $Z_1$. In the processing steps 605 to 607, preparation is made for the scalar multiplication. In more concrete, coordinates $[X_1, Z_1]$ are assigned to $[X_4, Z_4]$ in the step 605 to thereby allow $[X_1, Z_1]$ to be inputted to the doubling arithmetic (FIG. 5), the output of which is assigned to $[X_2, Z_2]$ in the step 606. In the step 607, $h_l h_{l-1} \ldots h_0$ are set as the binary bit string representing the scalar value m, in which the most significant bit $h_l$ is "1", and thus "1" is assigned to i in a step 701 shown in FIG. 7. In the succeeding processing steps 702 to 709, the addition method and the doubling method are controlled in dependence on whether one bit of the scalar value m is "0" or "1", to thereby determine the scalar multiplication. More specifically, in the step 702, "i-1" is assigned to i while in the step 703, $[X_1, Z_1], [X_2, Z_2]$ and $X_0$ are inputted to the addition method (FIG. 8), the output of which is assigned to $[X_3, Z_3]$. When $h_i==0$ (i.e., when the decision step 704 results in affirmation "Yes"), the processing proceeds to the step 707 when $h_t==1$, i.e., when the decision step 704 results in negation "No". In the step 705, $[X_1, Z_1]$ is inputted to the doubling method (FIG. 5), the output from which is assigned to $[X_1, Z_1]$. In the succeeding step 706, $[X_3, Z_3]$ is assigned to $[X_2, Z_2]$, whereupon the processing proceeds to the step 709. On the other hand, in the step 707, $[X_2, Z_2]$ is inputted to the doubling method (FIG. 5), the output of which is assigned to $[X_2, Z_2]$. In the succeeding step 708, $[X_3, Z_3]$ is assigned to $[X_1, Z_1]$, whereupon the processing proceeds to the decision step 709. In case the decision step 709 results in that i>0 (i.e., when the step 709 results in "Yes"), the step 702 is resumed. On the other hand when i<0, i.e., when the decision step results in "No", the processing proceeds to step 710 where $X_1/(Z_1)^2$ is assigned to the projective coordinate component $X_m$ to be ultimately outputted (step 711). The process ends at step 712.

Addition Method According to Second Embodiment

Figure 8:
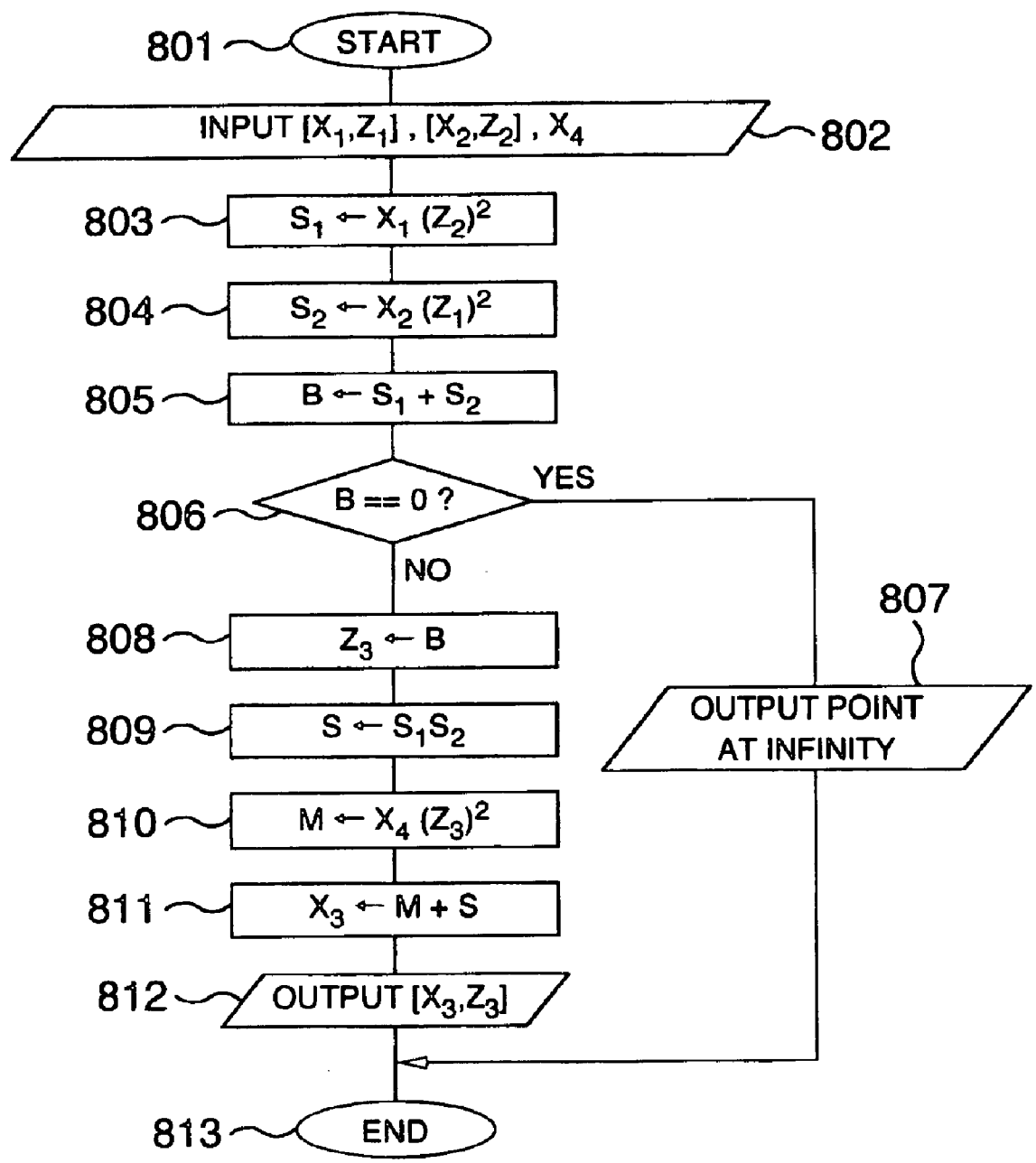
FIG. 8 is a flow chart for illustrating an addition procedure in the elliptic curve cryptography according to the second embodiment of the invention.

FIG. 8 is a flow chart for illustrating the addition method according to the second embodiment of the invention. Step 801 denotes start. It is presumed that the projective coordinates $[X_1, Z_1]$, $[X_2, Z_2]$ and $[X_4, Z_4]$ are inputted and that $[X_3, Z_3]$ or the point at infinity is to be outputted. Thus, the projective coordinates $[X_1, Z_1]$, $[X_2, Z_2]$ and $[X_4, Z_4]$ are inputted in a step 802. Through the processings in subsequent steps 803 to 807, $X_1(Z_2)^2+X_2(Z_1)^2$ is computed for making decision whether or not the result of the addition represents the point at infinity. Interim results $S_1$, $S_2$ and B provide preparation for realization of the expressions (6) and (7) mentioned previously. More specifically, $X_1(Z_2)^2$ is assigned to $S_1$ in the step 803. In the step 804, $X_2(Z_1)^2$ is assigned to $S_2$. In the step 805, $S_1+S_2$ is assigned to B. When it is decided that B==0 in the step 806 (i.e., when decision in the step 806 results in "Yes"), the processing proceeds to the step 807. If otherwise (i.e., when the decision in the step 806 results in "No"), the processing proceeds to the step 808. In the step 807, the point at infinity is outputted, whereon the processing proceeds to the step 813. Through the processing steps 808 to 811, the projective coordinates $[X_3, Z_3]$ are determined in accordance with the expressions (6) and (7) mentioned hereinbefore. In more concrete, B is assigned to $Z_3$ in the step 808. In the step 809, $S_1S_2$ is assigned to S. In the step 810, $X_4Z_3^2$ is assigned to M. In the step 811, M+S is assigned to $X_3$. Finally, in the step 812, $[X_3, Z_3]$ is outputted. Step 813 denotes end.

Through the procedure described above, the addition arithmetic can be realized by executing four times the multiplication of mutually different variables. Thus, it is apparent understood that with the addition arithmetic or method according to the second embodiment of the invention, the number of times the multiplication is required to be executed can be decreased when compared with the addition method according to the first embodiment of the invention described hereinbefore. Parenthetically, it should be added that the doubling arithmetic according to the second embodiment of the invention can be realized by making use of the doubling method according to the first embodiment of the invention.

The method of protects the private key information against leakage in terms of the deviation information of the processing time as described hereinbefore can also be carried out with the elliptic curve in a prime field in addition to the elliptic curve in the finite field of characteristic 2 (extension field of "2".

Next, description will be made of a third embodiment of the present invention which is directed to a method of preventing leakage of the private key information from the deviation information of the processing time by adopting the Montgomery method on the presumption that the elliptic curve in the prime field is represented by $By^2=x^3+Ax^2+Bx$.

As is disclosed in P. Montgomery: "SPEEDING THE POLLARD AND ELLIPTIC CURVE METHODS OF FACTORIZATION", Mathematics of Computation Vol. 48, No. 177, pp. 243–264 (1987), presuming that the addition of points P0(x0, y0) and P1(x1, y1) and the substraction therebetween are given by:

P3(x3, y3); P4(x4, y4);

$P1+P0=P3$;

$P1-P0=P4$;

then, x3 can speedily be determined from x0, x1 and x4 by resorting to the elliptic curve of the standard form $By^2=x^3+Ax^2+Bx$ in the prime field. In more concrete, x3 can be determined by performing six times the multiplications of the prime field as follows:

Presuming that (x3, y3)→$[X_3,Z_3]$ and that (x4, y4)→$(X_4, Z_4)$, then $X_3 \leftarrow Z_4[(X_1-Z_1)(X_0+Z_0)+(X_1+Z_1)(X_0-Z_0)]^2$, and $Z_3 \leftarrow X_4[(X_1-Z_1)(X_0+Z_0)-(X_1+Z_1)(X_0-Z_0)]^2$.

Further, for the doubling arithmetic, expressions mentioned below apply valid:

P5=2P1; (x1, y1)→$[X_1, Z_1]$;

$4X_1Z_1 \leftarrow (X_1+Z_1)^2-(X_1-Z_1)^2$;

$X_5 \leftarrow (X_1+Z_1)^2(X_1Z_1)^2$; $Z_5 \leftarrow (4X_1Z_1)[(X_1-Z_1)^2+((A+2)/4)(4X_1Z_1)]$ Furthermore, when the double point of P1 is given by P5(x5, y5), then x5 can be determined only from x1 by executing relevant multiplication five times. By taking advantage of this feature, the x-coordinate of scalar multiple (scalar value d) of the point R can be determined from Rx, as follows.

Presuming that the initial value is given by [R, 2R] and that mR represents the x-coordinate of m multiplication of the point R, the scalar value d is developed to the binary bit string. Then, starting from the most significant bit of d,

| | |
|---|---|
| [mR, (m+1)R] → [2mR, 2(m+1)R] | for the bit of d = "0", and |
| [mR, (m+1)R] → [(2m+1)R, 2(m+1)R] | for the bit of d = "1", |
| Hence | |
| (m+1)R − mR = R, and | |
| (m+1)R + mR = (2m+1)R. | |

Scalar Multiplication Method According to Third Embodiment

Figure 11A:
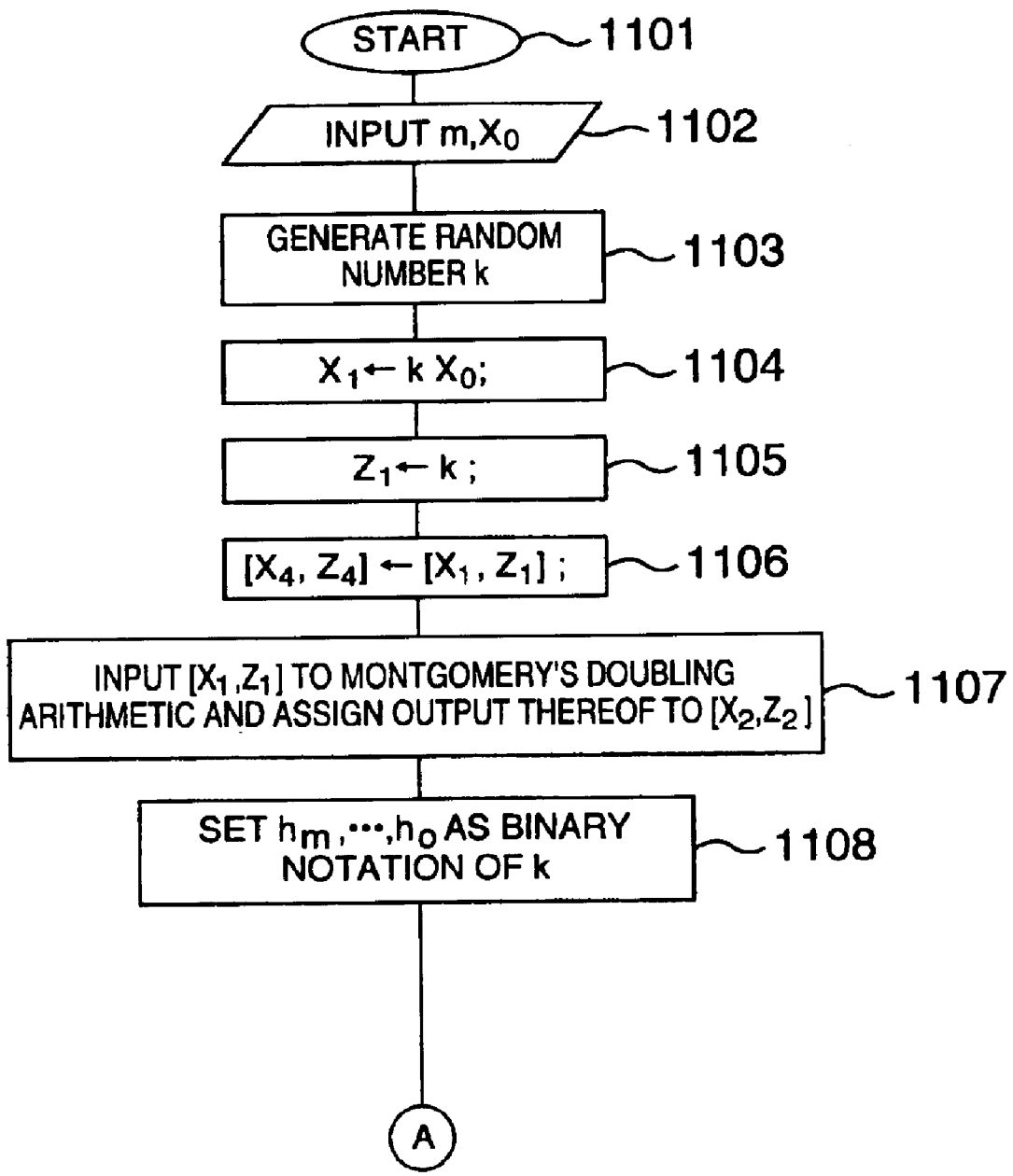
FIG. 11A is a flow chart for illustrating a part of a scalar multiplication procedure in which Montgomery method is adopted according to a third embodiment of the present invention.
Figure 11B:
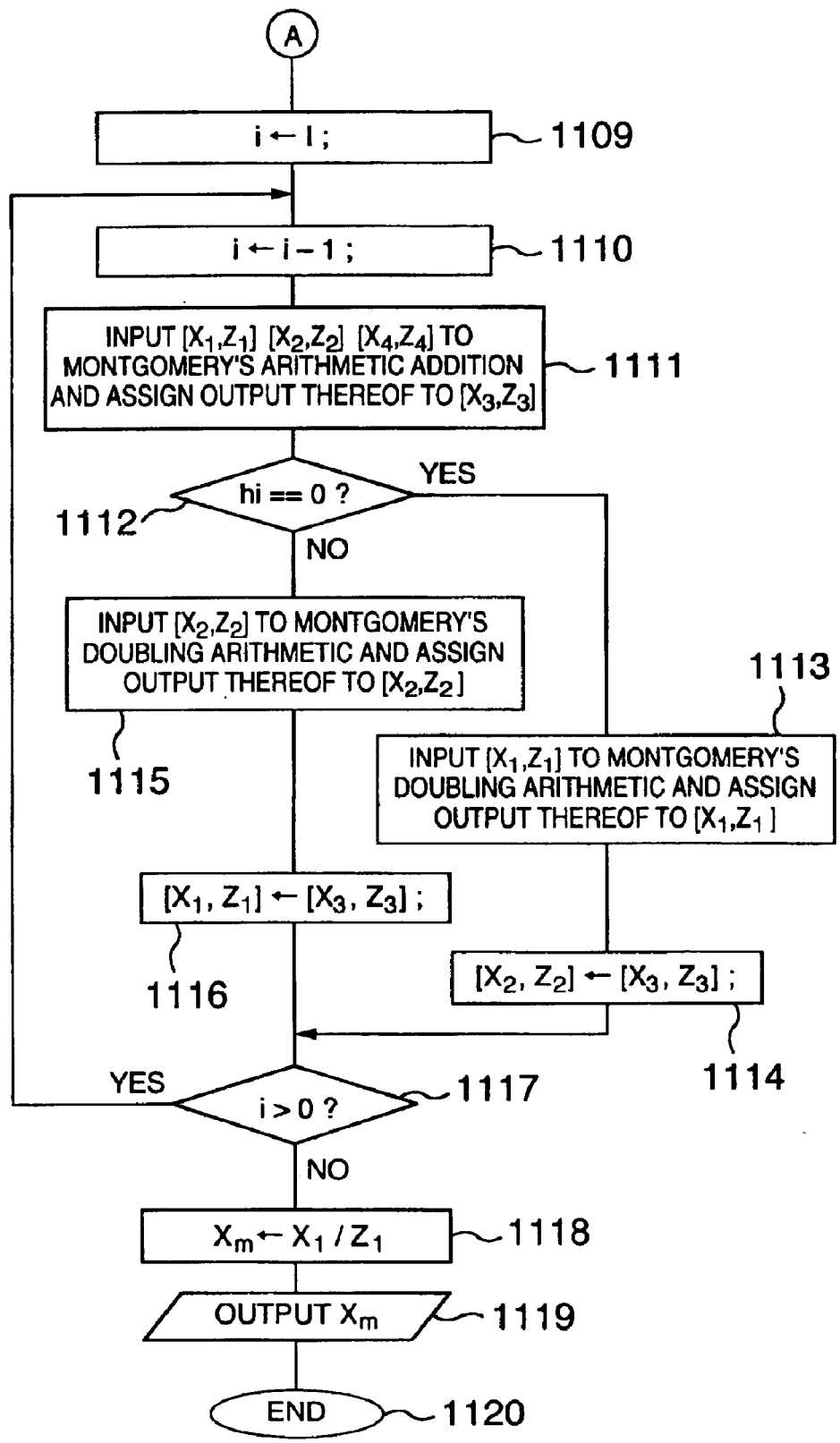
FIG. 11B is a flow chart for illustrating the other part of the scalar multiplication procedure mentioned just above.

FIGS. 11A and 11B are flow charts for illustrating the scalar multiplication method in which the Montgomery method is adopted according to the third embodiment of the present invention. Referring to the figures, the process starts at step 1101. It is presumed that a projective coordinate component $X_0$ of the x-coordinate of a given point R and a scalar value m are inputted and that a projective coordinate component $X_m$ of the x-coordinate of a point corresponding to m-multiplication of R is to be outputted. To this end, the scalar value m and the projective coordinate component $X_0$ of the x-coordinate are inputted in the step 1102 shown in FIG. 11A. In the succeeding steps 1103 to 1105, data is stirred through multiplication of the individual coordinates in the projective coordinate system by the random number. More specifically, the random number k is generated in step 1103, whereon $kX_0$ is determined by multiplying the projective component $X_0$ of the x-coordinate by the random number k, and then $kX_0$ is assigned to $X_1$ in the step 1104 while the random number k being assigned to $Z_1$ in the step 1105. In succession, $[X_1, Z_1]$ is assigned to $[X_4, Z_4]$ (step 1106). Subsequently, $[X_1, Z_1]$ is inputted to the doubling method (i.e., Montgomery's doubling arithmetic), the output of which is assigned to $[X_2, Z_2]$ (step 1107). Further, the scalar value m is transformed to the binary bit string $h_i h_{i-1} \ldots h_0$ (step 1108), where the most significant bit $h_1$ is "1". Thus "1" is assigned to i in the step 1109 shown in FIG. 11B. In a succeeding step 1110, "i-1" is assigned to i, which is then followed by a step 1111 where $[X_1, Z_1]$, $[X_2, Z_2]$ and $[X_4, Z_4]$ are inputted to the addition method (Montgomery's addition arithmetic), the output of which is assigned to $[X_3, Z_3]$ (step 1111). When $h_i==0$ in the step 1112 (i.e., when the decision step 1112 results in affirmation "Yes"), the processing proceeds to a step 1113 while it proceeds to a step 1115 when $h_i==1$, i.e., when the decision step 1112 results in negation "No". In the step 1113 shown in FIG. 11B, $[X_1, Z_1]$ is inputted to the doubling method (Montgomery's doubling arithmetic), the output from which is assigned to $[X_1, Z_1]$. In the succeeding step 1114, $[X_3, Z_3]$ is assigned to $[X_2, Z_2]$, whereon the processing proceeds to a step 1117. On the other hand, when the decision step 1112 results in "No", $[X_2, Z_2]$ is inputted to the doubling method (Montgomery's doubling arithmetic), the output of which is assigned to $[X_2, Z_2]$ (step 1115). Further, $[X_3, Z_3]$ is assigned to $[X_1, Z_1]$ in the step 1116, whereupon the processing proceeds to a step 1117. In the case where i>0, i.e., the step 1117 results in "Yes", the step 1110 is resumed. If otherwise, i.e., when the decision step 1117 results in "No", the processing proceeds to a step 1118 where $X_1/(Z_1)$ is assigned to the projective coordinate component $X_m$ to be ultimately outputted in the step 1119, whereupon the processing comes to an end (step 1120).

Through the procedure described above, determination of the x-coordinate corresponding to the scalar (d) multiplication of a given coordinate (x, y) can be realized by executing eleven times the mutually different multiplications for each bit of d. Furthermore, by setting for the given x-coordinate the initial value for scalar multiplication [kx, k] where k represents a random number, the private key information can be protected against leakage in terms of the deviation information of the d(x, y) processing time. In addition, this feature indicates that for the DPA (Differential Power Analysis) trial for performing the cryptanalysis by making use of deviation information concerning the of current, voltage, electric power for the encryption processing, the private key information can be protected against leakage in terms of the deviation information of the current (voltage, electric power) involved in processing d(x, y).

Furthermore, for the elliptic curve $y^2=x^3+ax+b$ in the prime field, an elliptic curve may be constituted such that the Abelian group defined by the rational points between $By^2=x^3+Ax^2 Bx$ and $y^2=x^3+ax+b$ is same, whereon the coordinates (x, y) given by the elliptic curve $y^2=x^3+ax+b$ in the prime field is transformed to $By^2=x^3+Ax^2Bx$, to thereby determine the scalar multiplication through the procedure described hereinbefore, the result of which is then transformed to $y^2=x^3+ax+b$.

Next, description will be directed to a fourth embodiment of the present invention. In the case of the elliptic curve cryptography according to the first embodiment of the invention, it has been presumed that $[X, Y, Z]=[\lambda^2 X, \lambda^3 Y, \lambda Z]$ applies valid for the given projective coordinate $\geq \neq 0$. However, the teachings of the present invention can also be implemented with the projected coordinate system in which $[X, Y, Z]=[\lambda X, \lambda Y, \lambda Z]$ applies valid.

Scalar Multiplication Method According to Fourth Embodiment

Figure 12A:
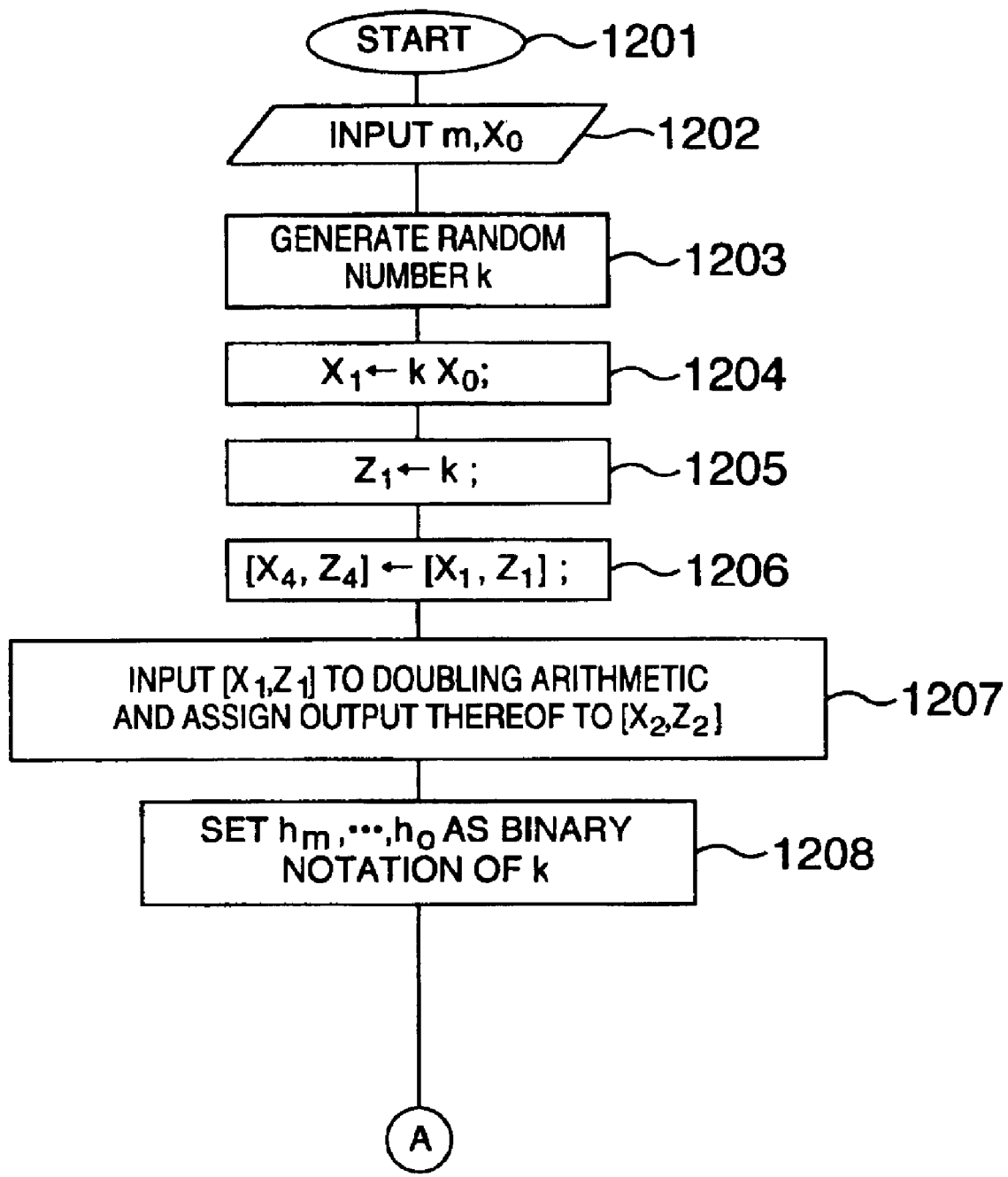
FIG. 12A is flow chart for illustrating a part of a scalar multiplication procedure according to a fourth embodiment of the present invention.
Figure 12B:
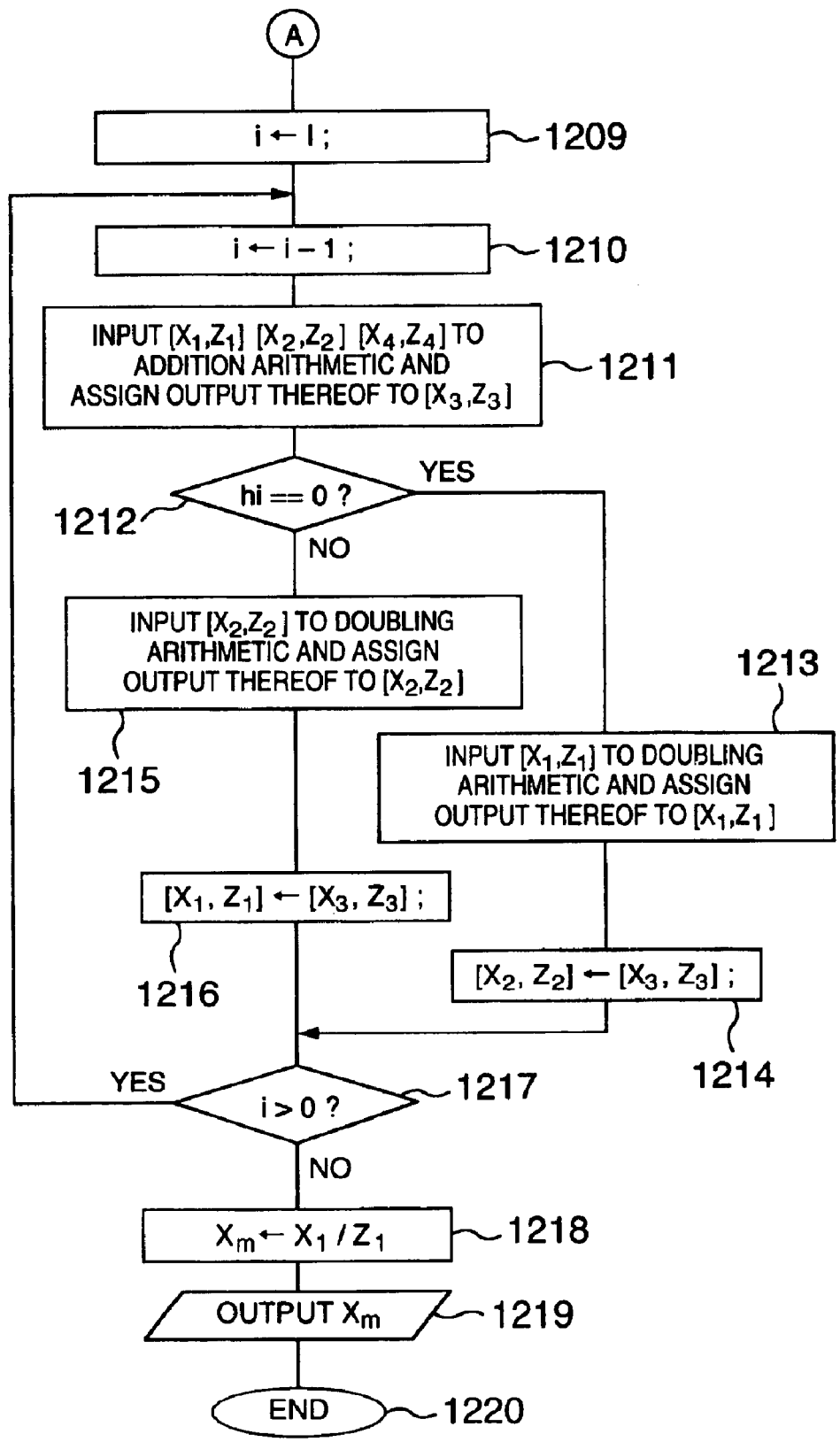
FIG. 12B is flow chart for illustrating the other part of the scalar multiplication procedure mentioned just above.

FIGS. 12A and 12B are flow charts for illustrating the scalar multiplication method according to the fourth embodiment of the present invention. Referring to the figures, the process starts at step 1201. It is presumed that a projective coordinate component $X_0$ of the x-coordinate of a given point R and a scalar value m are inputted and that a projective component $X_m$ of the x-coordinate of a point corresponding to m-multiplication of R (i.e., the point corresponding to the product of m and R) is to be outputted. On the presumption, the scalar value m and the projective coordinate component $X_0$ of the x-coordinate are inputted in the step 1202 shown in FIG. 12A. In the succeeding steps 1203 to 1205, data is stirred through multiplication of the individual projective coordinates by the random number. More specifically, the random number k is generated in the step 1203, whereon $kX_0$ is determined by multiplying the projective coordinate component $X_0$ of the x-coordinate by the random number k, and then $kX_0$ is assigned to $X_1$ in the step 1204 while the random number k itself being assigned to $Z_1$ in the step 1205. In succession, $[X_1, Z_1]$ is assigned to $[X_4, Z_4]$ (step 1206). Subsequently, $[X_1, Z_1]$ is inputted to the doubling arithmetic, the output of which is assigned to $[X_2, Z_2]$ (step 1207). Further, the scalar value m is transformed to the binary bit string $h_i h_{i-1} \ldots h_0$ (step 1208), where the most significant bit $h_1$ is "1". Thus, "1" is assigned to i in the step 1209 shown in FIG. 12B. In a succeeding step 1210, "i-1" is assigned to i, which is then followed by a step 1211 where $[X_1, Z_1]$, $[X_2, Z_2]$ and $[X_4, Z_4]$ are inputted to the addition arithmetic, the output of which is assigned to $[X_3, Z_3]$. When $h_i=="0"$ in the step 1212 (i.e., when he decision step 1212 results in affirmation "Yes"), the processing proceeds to a step 1213 while it proceeds to a step 1215 when $h_{-i}"1"$, i.e., when the decision step 1212 results in negation "No". In the step 1213 shown in FIG. 12B, $[X_1, Z_1]$ is inputted to the doubling arithmetic, the output from which is assigned to $[X_1, Z_1]$.In the succeeding step 1214, $[X_3, Z_3]$ is assigned to $[X_2, Z_2]$, whereon the processing proceeds to a step 1217. On the other hand, when the decision step 1212 results in "No", $[X_2, Z_2]$ is inputted to the doubling arithmetic, the output of which is assigned to $[X_2, Z_2]$ (step 1215). Further, $[X_3, Z_3]$ is assigned to $[X_1, Z_1]$ in the step 1216, whereupon the processing proceeds to a step 1217. In the case where i>0, i.e., when the step 1217 results in "Yes", the step 1210 is resumed. If otherwise, i.e., when the decision step 1217 results in "No", the processing proceeds to a step 1218 where $X_1/(Z_1)$ is assigned to the projective coordinate component $X_m$ to be ultimately outputted in the step 1219, whereupon the processing comes to an end (step 1220).

It is presumed that in conjunction with the projective space coordinate of a point on the elliptic curve, it applies valid that $[X, Y, Z]=[\lambda x, \lambda Y, \lambda Z]$ for a given $\lambda \neq 0$. At this juncture, let's consider points $P0=(x0, y0)=[X_0, Y_0, Z_0]$ and $P1=(x1, y1)=[X_1, Y_1, Z_1]$ as the points on the elliptic curve.

Additionally, it is presumed that the sum and the difference of the points P0 and P1 are given by P3=(x3, y3,)=[$X_3$, $Y_3$, $Z_3$] and P4=(x4, y4)=[$X_4$, $Y_4$, $Z_4$], respectively.

Namely, $P1+P0=P3$, and $P1-P0=P4$

Subsequently, relations in the projective coordinate system are derived from the expression (1) mentioned hereinbefore in conjunction with the first embodiment of the invention, i.e., $x3+x4=(x0\ x1)/(x0+x1)^2$.

Replacing x1 and x0 appearing in the expression (1) by $X_1/Z_1$ and $X_0/Z_0$, respectively, then $$X_3/Z_3 = X_4/Z_4 + ((X_0/Z_0)(X_1/Z_1))/(X_0/Z_0 + X_1/Z_1)^2$$
$$= X_4/Z_4 + ((X_0Z_0)(X_1Z_1))/(X_0Z_1 + X_1Z_0)^2$$
$$= ((X_4\beta^2) + Z_4(X_0Z_0)(X_1Z_1))/(Z_4\beta^2)$$

where $\beta=X_0Z_1+X_1Z_0$.

From the above expression, there can be derived:

$$X_3=X_4\beta^2+Z_4\ (X_0Z_1)(X_1Z_0) \quad (2)'$$

$$Z_3=Z_4\beta^2 \quad (3)'$$

On the presumption that mR=[$X_1$, $Y_1$, $Z_1$], (m+1)R=[$X_2$, $Y_2$, $Z_2$], R=[$X_4$, $Y_4$, $Z_4$] and (2m+1)R=[$X_3$, $Y_3$, $Z_3$], an addition method according to the fourth embodiment of the present invention will be elucidated below.

Addition Method According to Fourth Embodiment

Figure 13:
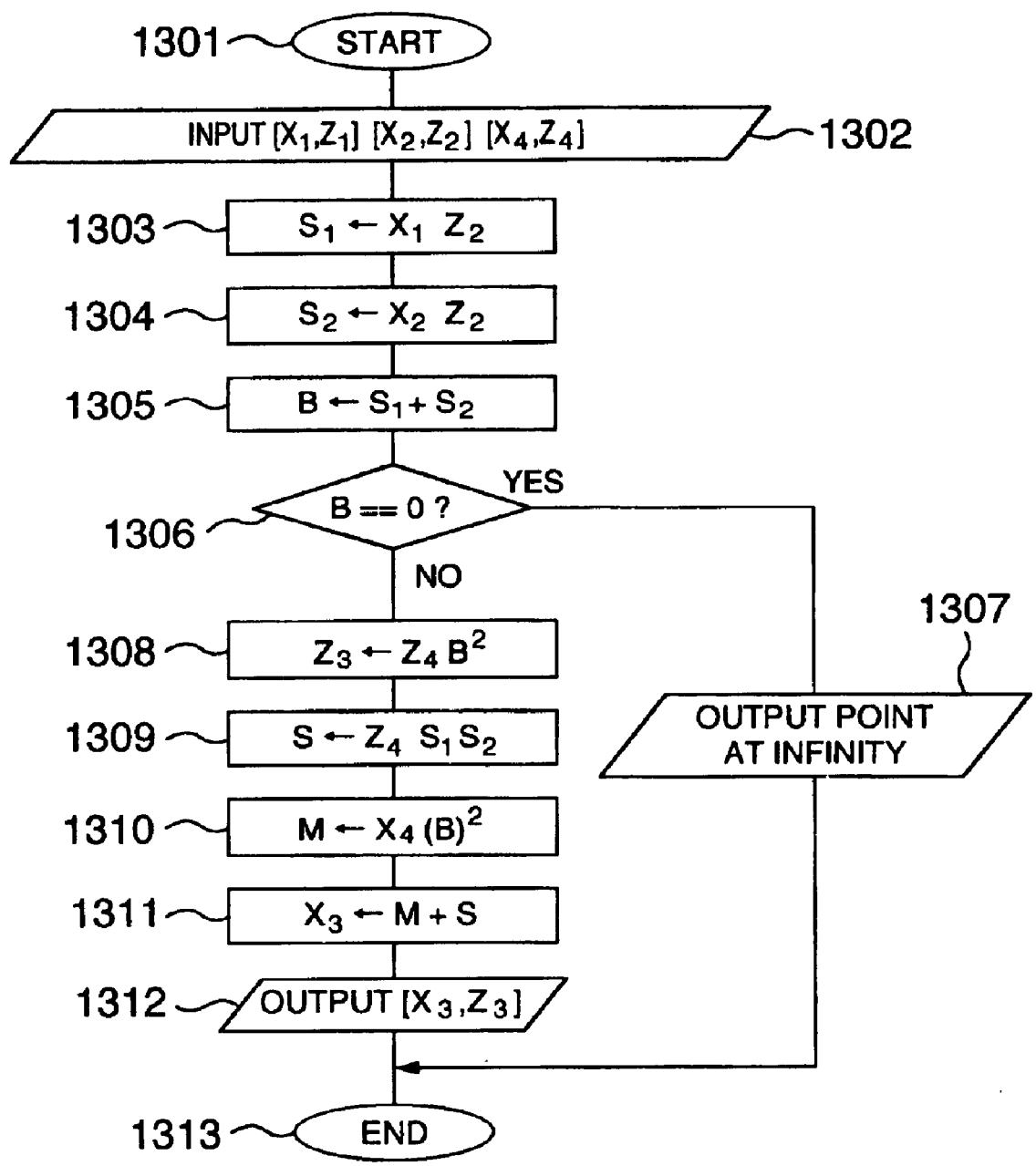
FIG. 13 is a flow chart for illustrating an addition procedure according to the fourth embodiment of the present invention.

FIG. 13 is a flow chart for illustrating an addition method according to the fourth embodiment of the present invention. The process starts at step 1301. It is assumed that projective coordinates [$X_1$, $Z_1$], [$X_2$, $Z_2$] and [$X_4$, $Z_4$] are inputted, whereby [$X_3$, $Z_3$] or the point at infinity is outputted. Thus, projective coordinates [$X_1$, $Z_1$], [$X_2$, $X_2$] and [$X_4$, $Z_4$] are inputted in a step 1302. Subsequently $X_1Z_2$ is assigned to $S_1$ in a step 1303. Further, $X_2Z_1$ is assigned to $S_2$ in a step 1304, whereon $S_1+S_2$ is assigned to B in a step 1305. When B==0 in a step 1306 (i.e., when decision in the step 1306 results in "Yes"), the processing proceeds to a step 1307. If otherwise (i.e., when the decision in the step 1306 results in "No"), the processing proceeds to a step 1308. In the step 1307, the point at infinity is outputted, and then a step 1313 is executed. On the other hand, when the decision step 1306 results in "No", $Z_4B^2$ is assigned to $Z_3$ in a step 1308. Further, $(Z_4)^2S_1S_2$ is assigned to S in a step 1309. Subsequently, $X_4B^2$ is assigned to M in a step 1310 while M+S is assigned to $X_3$ in a step 1311, whereon [$X_3$, $Z_3$] is outputted in a step 1312.

Through the procedure described above, the addition arithmetic can be realized by executing six times the multiplication of mutually different variables.

Next, description will turn to the doubling method. Let's represent a double point of P1 by P2 and presume that P1=(x1, y1)=[$X_1$, $Y_1$, $Z_1$] and P2=(x2, y2)=[$X_2$, $Y_2$, $Z_2$]. The doubling expression is given by $x2=(x1)^2+b/(x1)^2$. Accordingly, in the doubling arithmetic formulae $x2=(x1)^2+b/(x1)^2$, x1 is replaced by $X_1/Z_1$ with x2 being replaced by $X_2/Z_2$.

Namely, $$X_2/Z_2 = (X_1/Z_1)^2 + b/(X_1/Z_1)^2$$
$$= X_1^2/(Z_1)^2 + (bZ_1^2)/(X_1)^2$$
$$= (X_1^4 + b(Z_1)^8)/(X_1^2Z_1^2)$$

Thus, there can be derived the following relations.

$$X_2=X_1^4+bZ_1^4 \quad (4)$$

$$Z_2=X_1^2Z_1^2 \quad (5)$$

The doubling method based on the expressions mentioned above will be described below.

Doubling Method According to Fourth Embodiment

Figure 14:
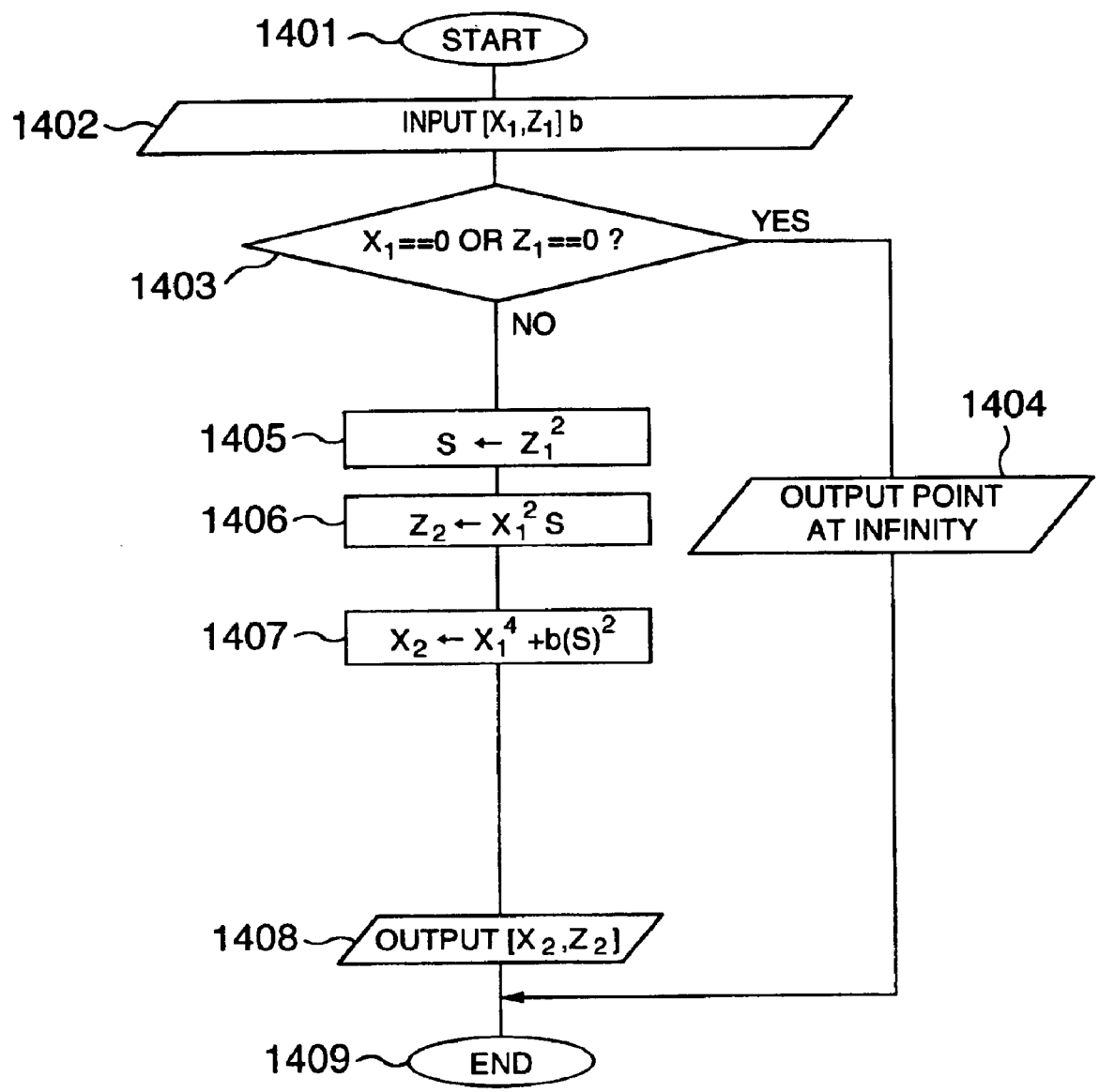
FIG. 14 is a flow chart for illustrating a doubling method according to the fourth embodiment of the invention.

FIG. 14 is a flow chart for illustrating a doubling method according to the fourth embodiment of the invention. The processing starts at step 1401. It is presumed that Q=[$X_1$, $Z_1$] and b are inputted for thereby outputting 2Q=[$X_2$, $Z_2$] or the point at infinity. More specifically, [$X_1$, $Z_1$] and b are inputted in a step 1402. When $X_2$==0 or $Z_2$==0 (i.e., when the decision in the step 1403 results in "Yes"), the processing proceeds to a step 1404. If otherwise (i.e., when the decision in step 1403 results in "No"), the processing proceeds to the step 1405. In the step 1404, the point at infinity is outputted. In the step 1405, $Z_1^2$ is assigned to $Z_2$. In the step 1406, $X_1^2S$ is assigned to S. In the step 1407, $X_1^4+bS$ is assigned to $X_2$, which is then followed by a step 1408 where [$X_2$, $Z_2$] is outputted. Through the procedure described above, the addition arithmetic can be realized by executing twice the multiplication of mutually different variables. The process ends at step 1409.

Through the procedure described above, determination of the x-coordinate corresponding to the scalar (d) multiplication of given coordinates (x, y) can be realized by executing eight times the multiplication processing for each bit of d. Furthermore, by setting [kx, k] for the given x-coordinate as the initial value for the scalar multiplication, where k represents a random number, the private key information can be protected against leakage in terms of the deviation information of the d(x, y) processing time. Further, this feature indicates that in the DPA (Differential Power Analysis) for realizing the cryptanalysis, the private key information can also be prevented from leakage as the deviation (or difference) information of the current (voltage, electric power) involved in the processing of d(x, y).

Next, description will be directed to a fifth embodiment of the present invention. In the case of the elliptic curve cryptography according to the second embodiment of the invention, it has been presumed that [X, Y, Z]=[$\lambda^2X$, $\lambda^3Y$, $\lambda Z$] applies valid for the given projective coordinate $\lambda\neq0$. However, the teachings of the present invention can also be implemented with the projective coordinate system in which [X, Y, Z]=[$\lambda X$, $\lambda Y$, $\lambda Z$] applies valid.

When the transformation from the affine coordinates to the projective coordinates can be given by (x, y)→[x, y, 1], then it applies valid that $Z_4$=1.

Scalar Multiplication Method According to Fifth Embodiment

Figure 15A:
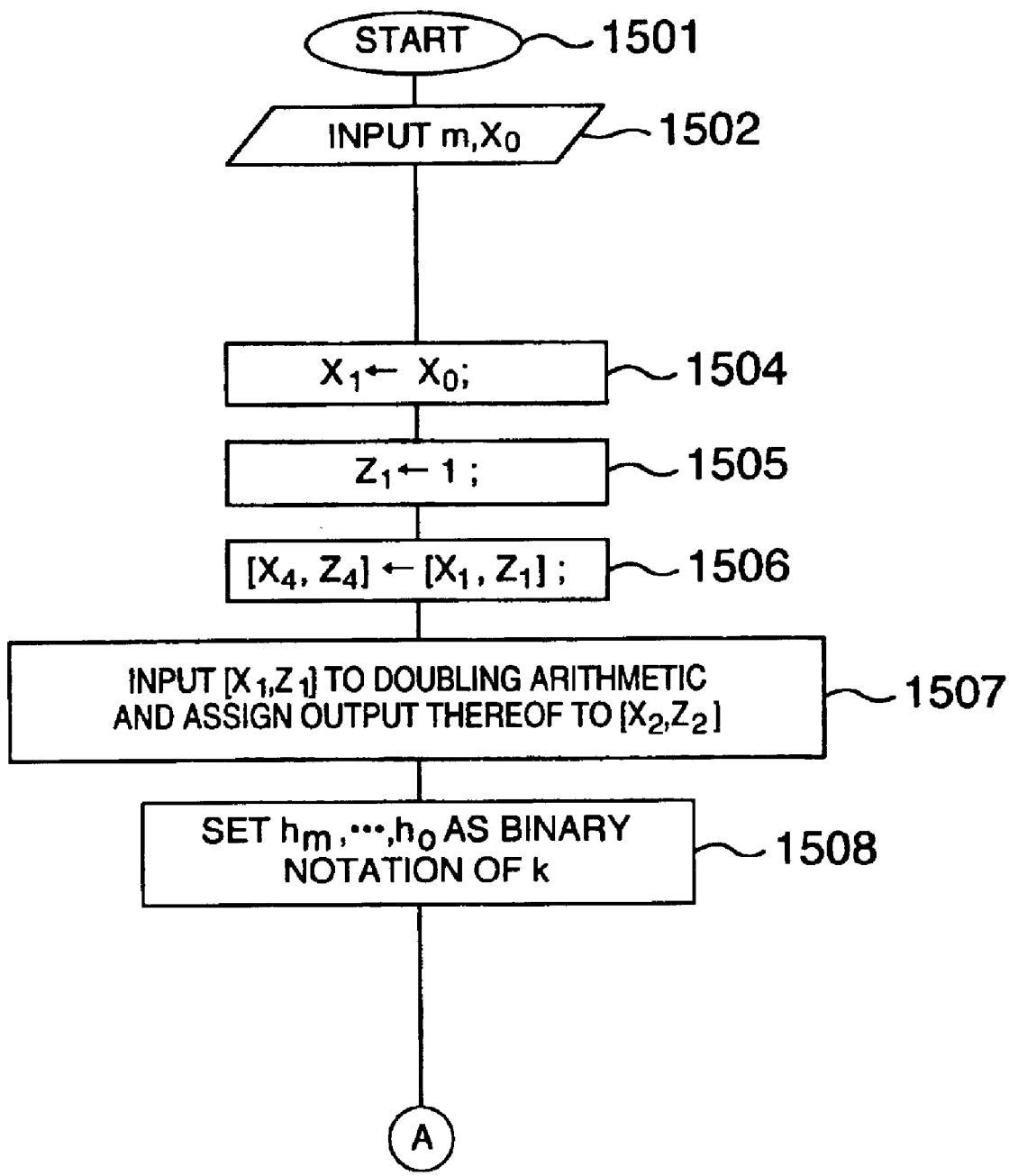
FIGS. 15A and 15B are a flow chart for illustrating a scalar multiplication procedure according to a fifth embodiment of the present invention.
Figure 15B:
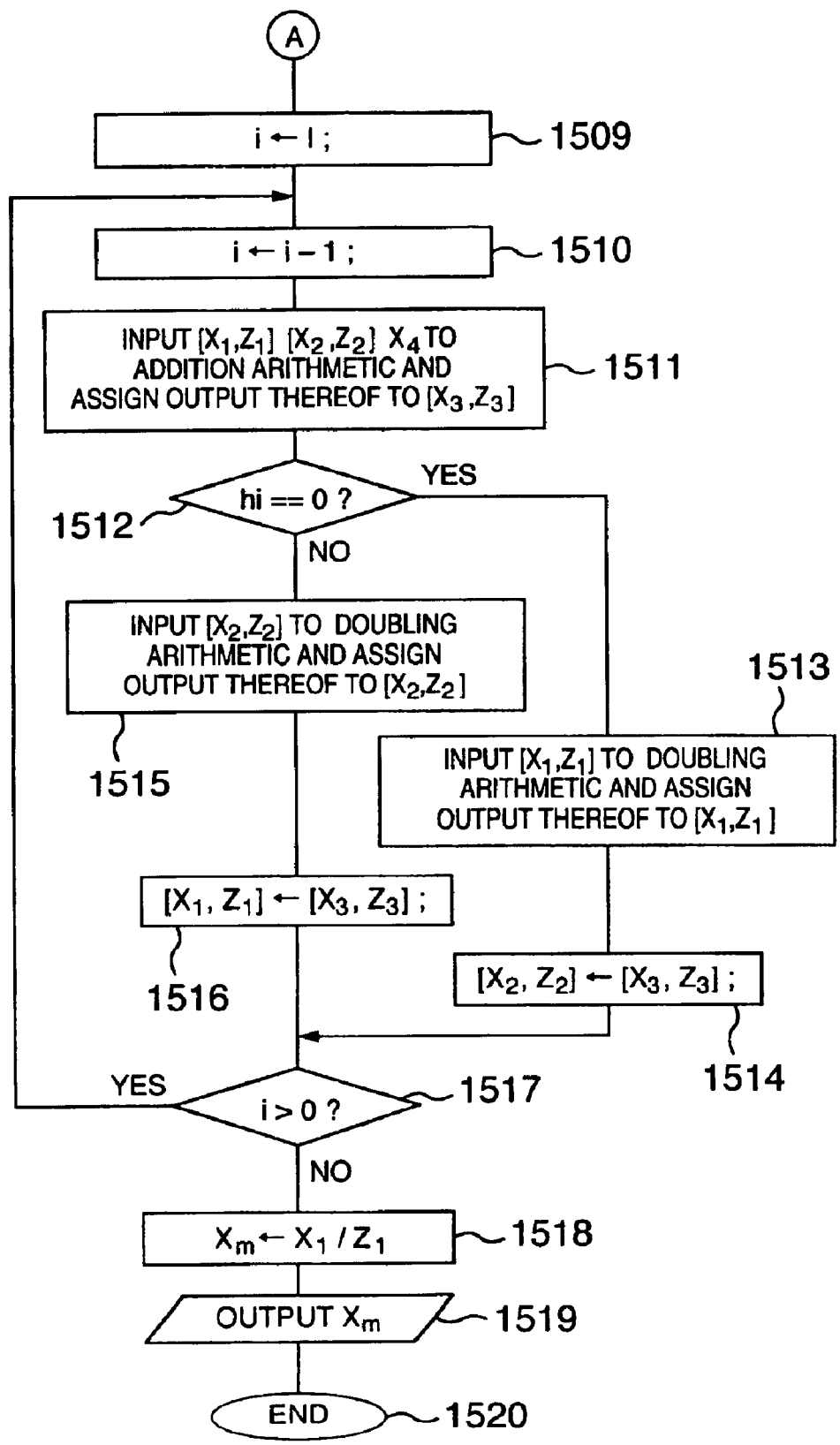

FIGS. 15A and 15B are flow charts for illustrating the scalar multiplication method according to the fifth embodiment of the present invention. Referring to the figures, it is presumed that a projective coordinate component $X_0$ of the x-coordinate of a given point R and a scalar value m are inputted and that a projective coordinate component $X_m$ of the x-coordinate of a point corresponding to m-multiplication of R (i.e., the point corresponding to the product of m and R) is to be outputted. On the presumption, the scalar value m and the projective coordinate component $X_0$ of the x-coordinate are inputted in the step 1502 shown in FIG. 15A. $X_0$ is assigned to $X_1$ in the step 1504. In a succeeding step 1505, "1" is assigned to $Z_1$. In succession, $[X_1, Z_1]$ is assigned to $[X_4, Z_4]$ in a step 1506. Subsequently, $[X_1, Z_1]$ is inputted to the doubling arithmetic, the output of which is assigned to $[X_2, Z_2]$ (step 1507). Further, the scalar value m is transformed to the binary bit string $h_i h_{i-1} \ldots h_0$ (step 1508), where the most significant bit $h_i$ is "1". Thus, "1" is assigned to i in the step 1509 shown in FIG. 15B. In a succeeding step 1510, "i-1" is assigned to i, which is then followed by a step 1511 where $[X_1, Z_1], [X_2, Z_2]$ and $Z_4$ are inputted to the addition arithmetic, the output of which is assigned to $[X_3, Z_3]$. When $h_i == $ "0" in the step 1512 (i.e., when the decision step 1512 results in affirmation "Yes"), the processing proceeds to a step 1513 while it proceeds to a step 1515 when $h_{i===}$"1", i.e., when the decision step 1512 results in negation "No". In the step 1513 shown in FIG. 15B, $[X_1, Z_1]$ is inputted to the doubling arithmetic, the output from which is assigned to $[X_1, Z_1]$. In the succeeding step 1514, $[X_3, Z_3]$ is assigned to $[X_2, Z_2]$, whereon the processing proceeds to a step 1517. On the other hand, when the decision step 1512 results in "No", $[X_2, Z_2]$ is inputted to the doubling arithmetic, the output of which is assigned to $[X_2, Z_2]$ (step 1515). Further, $[X_3, Z_3]$ is assigned to $[X_1, Z_1]$ in the step 1516, whereupon the processing proceeds to the step 1517. When i>0 in the step 1517, i.e., when the step 1517 results in "Yes", the step 1510 is resumed. If otherwise, i.e., when the decision step 1517 results in "No", the processing proceeds to a step 1518 where $X_1/(Z_1)$ is assigned to the projective coordinate component $X_m$ which is ultimately outputted in the step 1519, whereupon the processing comes to an end (step 1520).

Addition Method According to Fifth Embodiment

Figure 16:
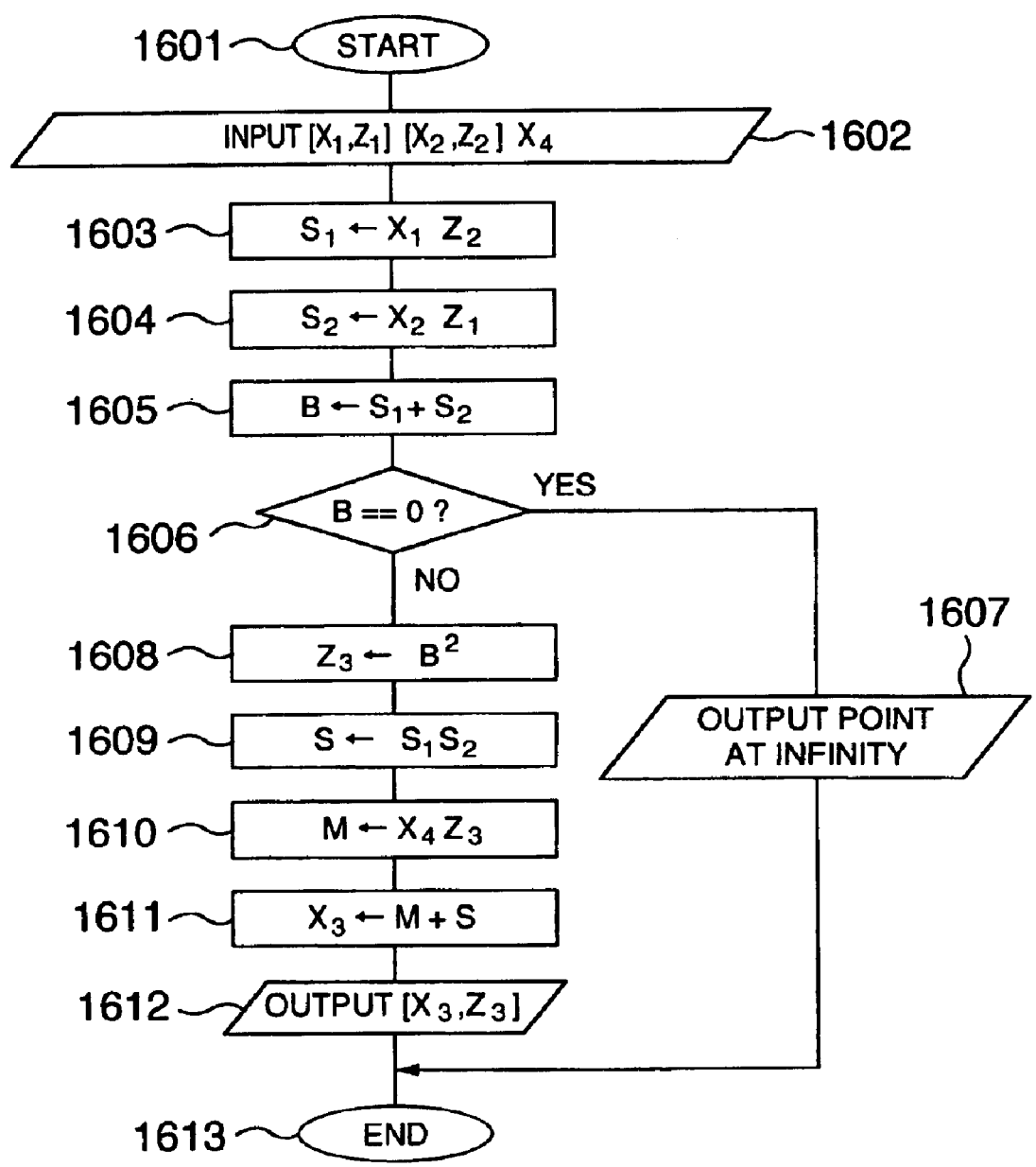
FIG. 16 is a flow chart for illustrating an addition procedure according to the fifth embodiment of the present invention.

FIG. 16 is a flow chart for illustrating an addition method according to the fifth embodiment of the present invention. The process starts at step 601. It is assumed that projective coordinates $[X_1, Z_1], [X_2, Z_2]$ and $X_4$ are inputted, whereby $[X_3, Z_3]$ or the point at infinity is outputted. Thus, projective coordinates $[X_1, Z_1], [X_2, Z_2]$ and $X_4$ are inputted in a step 1602. In the succeeding step 1603, $X_1 Z_2$ is assigned to $S_1$. Further, $X_2 Z_1$ is assigned to $S_2$ in a step 1604 with $S_1 + S_2$ being assigned to B in a step 1605. When B==0 in a step 1606 (i.e., when decision in the step 1606 results in "Yes"), the processing proceeds to a step 1607. If otherwise (i.e., when decision in the step 1606 results in "No), the processing proceeds to a step 1608. In the step 1607, the point at infinity is outputted, whereon an end step 1613 is executed. On the other hand, unless B=0 in the step 1606, $B^2$ is assigned to $Z_3$ (step 1608). In the succeeding step 1609, $S_1 S_2$ is assigned to S. Further, $(X_4 Z^3)$ is assigned to M in a step 1610 while M+S is assigned to $X_3$ in a step 1611. Finally, $[X_3, Z_3]$ is outputted in a step 1612. The process ends at step 1613. Through the procedure described above, the addition arithmetic can be realized by executing four times the multiplication of mutually different variables. Parenthetically, as the doubling arithmetic according to the instant embodiment of the invention, the doubling arithmetic described hereinbefore can be adopted. Additionally, the method incarnated in the instant embodiment can also find application not only to the arithmetic with the elliptic curve in the finite field of characteristic 2 but also to the arithmetic with the elliptic curve in the prime field.

Sixth Embodiment

Figure 9:
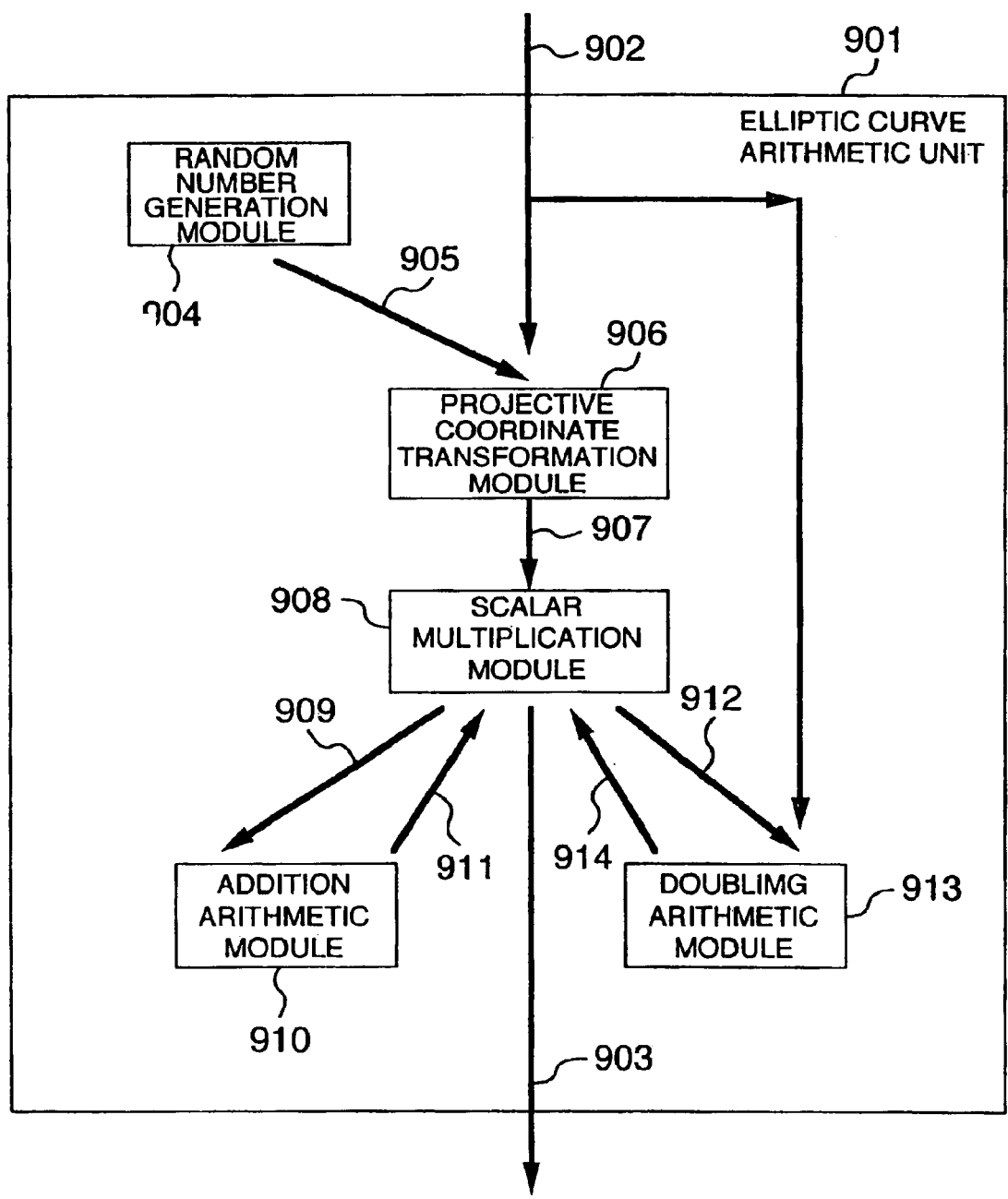
FIG. 9 is a functional block diagram showing schematically a structure of the elliptic curve arithmetic unit of the elliptic curve cryptograph apparatus according to a sixth embodiment of the present invention.

Next, description will be made of the elliptic curve arithmetic unit according to a sixth embodiment of the present invention. FIG. 9 is a functional block diagram showing schematically a structure of the elliptic curve arithmetic unit according to the sixth embodiment of the present invention. In the figure, reference numeral 901 denotes generally an elliptic curve arithmetic unit which corresponds to the one shown in FIG. 1 and designated by the reference numeral 109. Referring to FIG. 9, inputted to the elliptic curve arithmetic unit 901 are x-coordinate $X_0$ of a given point, a scalar value m and a parameter b of the elliptic curve of the standard form given by $y^2 + xy = x^3 + ax^2 + b$ in the finite field of characteristic 2 (extension field of "2"), as indicated by an arrow 902, whereby x-coordinate $X_m$ of a point corresponding to m-multiplication of above-mentioned given point is outputted from the elliptic curve arithmetic unit 901, as indicated by an arrow 903. At this juncture, it should however be mentioned that although the instant embodiment of the invention is described in conjunction with the elliptic curve in the finite field of characteristic 2, the invention can equally be implemented with the elliptic curve in the prime field.

The elliptic curve arithmetic unit 901 has input 902 and output 903 and includes a random number generation module 904 for generating a random number k to be outputted, as indicated by an arrow 905. The random number k generated by the random number generation module 904 is inputted to a projective coordinate transformation module 906 together with the x-coordinate $X_0$, the scalar value m and the parameter b although they are not shown in FIG. 9, to be thereby transformed to the projective coordinates $[kX_0, k]$, which is then assigned to $[X_1, Z_1]$. The projective coordinate $[X_1, Z_1]$ and the scalar value m are inputted to a scalar multiplication module 908 (arrow 907), whereby a point given by $[X_1, Z_1]$ multiplied by m is determined. Thus, the x-coordinate $X_m$ of the point as determined is outputted from the scalar multiplication module 908 (arrow 912). In the scalar multiplication module 908, $[X_1, Z_1]$ is first assigned to $[X_4, Z_4]$ which may be previously stored in a memory incorporated, for example, in the scalar multiplication module. Further, the projective coordinates $[X_1, Z_1]$ are supplied to a doubling arithmetic module 913 for determining a double point $[X_2, Z_2]$. Subsequently, m is developed to a binary bit string. Every time the bit assumes "0", starting the more significant bit, $[X_1, Z_1]$ is supplied to the doubling arithmetic 913, whereon the double point outputted from the doubling arithmetic module 913 is assigned to $[X_1, Z_1]$ (arrow 914). Subsequently, projective coordinates $[X_1, Z_1], [X_2, Z_2]$ and $[X_4, Z_4]$ are inputted to an addition arithmetic module 910 (arrow 909), and the addition point outputted from the addition arithmetic module 910 is assigned to $[X_2, Z_2]$ (arrow 911). On the other hand, when the bit is "1", the projective coordinates $[X_2, Z_2]$ are outputted to the doubling arithmetic module 913, whereon the double point outputted from the doubling arithmetic module 913 is assigned to $[X_2, Z_2]$. Subsequently, the projective coordinates, $[X_1, Z_1], [X_2, Z_2]$ and $[X_4, Z_4]$ are inputted to the addition arithmetic module 910, and the addition point outputted from the addition arithmetic module 910 is assigned to $[X_1, Z_1]$. Thus, there is derived the $X_m$-coordinate of the m-tuple point.

Inputted to the addition arithmetic module 910 is $[X_1, Z_1]$, $[X_2, Z_2], [X_4, Z_4]$ for arithmetically determining $[X_3, Z_3]$ which satisfies the conditions that $[X_3, Z_3] = [X_2, Z_2] + [X_1, Z_1]$ and that $[X_4, Z_4] = [X_2, Z_2] - [X_1, Z_1]$. The coordinates $[X_3, Z_3]$ are then outputted from the addition arithmetic module 910.

More specifically, assigning arithmetics $S_1 \leftarrow X_1 Z_2^2$, $S_2 \leftarrow X_2 Z_1^{2 \; and \; B \leftarrow S}{}_1 + S_2$ are first executed. When B==0, the point at infinity is outputted, whereupon the processing comes to an end. Unless B=0, assigning arithmetics $Z_3 \leftarrow Z_4 B$, $S \leftarrow Z_4^2 S_1 S_2$, $M \leftarrow X_4 Z_3^2$ and $X_3 \leftarrow M + S$ are executed.

Inputted to the doubling arithmetic module 913 are $[X_1, Z_1]$ and b for arithmetically determining the coordinates $[X_2, Z_2]$ which satisfy the conditions that $[X_2, Z_2]=[X_1, Z_1]+[X_1, Z_1]$. The coordinates $[X_2, Z_2]$ are then outputted from the doubling arithmetic module 913. In the case where $X_1==0$ or $Z_1==0$, the point at infinity is outputted. If otherwise, assigning arithmetics $S \leftarrow Z_1^2$, $Z_2 \leftarrow X_1 S$ and $X_2 \leftarrow X_1^4 + b(S)^4$ are executed.

In the case of the embodiment described above, it has been assumed that the x-coordinate $X_0$ is transformed to the projective coordinates $[kX_0, k]$. However, it goes without saying that the teachings of the present invention can equally be applied to the transformation of the x-coordinate $X_0$ to the projective coordinates $[k^2 X_0, k]$.

Finally, it should be added that the methods according to the embodiments of the invention described in the foregoing can be stored in a recording medium in the form of a program or programs executable with a computer without departing from the spirit and scope of the present invention.

As will be appreciated from the foregoing description, the elliptic curve encryption processing can be executed at a significantly increased speed according to the teachings of the invention when compared with the conventional cryptograph technologies. Furthermore, by virtue of such arrangement that the processing time for d(x, y) does not depend on the bit pattern of d in realization of the elliptic curve cryptography, the private key information can be protected against leakage from or in terms of the deviation information.

Many modifications and variations of the present invention are possible in the light of the above techniques. It is therefore to be understood that within the scope of the appended claims, the invention may be practiced otherwise than as specifically described.

What is claimed is:

1. A method of implementing an elliptic curve cryptographic operation in a cryptographic apparatus implementing an elliptic curve cryptography in a finite field of characteristic 2 (or an extension field of "2"), in which said elliptic curve is given by $y^2+xy=ax^2+b$ and in which x and y are variables in an x-y coordinate system, a and b are parameters, addition of points P1(x1, y1) and P2(x2, y2) on said elliptic curve composed of points defined by individual coordinate components is presumed to be represented by P3(x3, y3) with subtraction of said points P1(x1, y1) and P2(x2, y2) being presumed to be represented by P4(x4, y4), said method comprising the steps performed by said cryptographic apparatus, of:

inputting the coordinate component x1;
transforming the inputted coordinate component x1 into x-coordinates and z-coordinates $[X_1, Z_1]$ of a projective space where z is a variable of a projective space where z is a variable in the z-coordinate;
storing said coordinates $[X_1, Z_1]$ of said projective space;
transforming the coordinate component x2 into coordinates $[X_2, Z_2]$ of said projective space;
storing the projective coordinates $[X_2, Z_2]$;
transforming the coordinate component x4 into coordinates $[X_4, Z_4]$ of said projective space;
storing the coordinates $[X_4, Z_4]$;
determining projective coordinates $[X_3, Z_3]$ from the stored projective coordinates $[X_1, Z_1]$, $[X_2, Z_2]$ and $[X_4, Z_4]$;
transforming said projective coordinates $[X_3, Z_3]$ into the coordinate component x3; and
outputting said coordinate component x3,
whereby scalar multiplication of said point P1(x1, y1) is determined;
generating a random number k;
storing said generated random number k;
transforming the x-coordinates into projective coordinates to thereby derive projective coordinates $[k^2 x, k]$ through arithmetic operation of individual coordinate components of said projective space and said stored random number k.

2. A method of implementing an elliptic curve cryptographic operation in a cryptographic apparatus implementing an elliptic curve cryptography in a finite field of characteristic 2 (or an extension field of "2"), in which said elliptic curve is given by $y^2+xy=ax^2+b$ and in which x and y are variables in an x-y coordinate system, a and b are parameters, addition of points P1(x1, y1) and P2(x2, y2) on said elliptic curve composed of points defined by individual coordinate components is presumed to be represented by P3(x3, y3) with subtraction of said points P1(x1, y1) and P2(x2, y2) being presumed to be represented by P4(x4, y4), said method comprising the steps performed by said cryptographic apparatus, of:

inputting the coordinate component x1;
transforming the inputted coordinate component x1 into x- and z-coordinates coordinates $[X_1, Z_1]$ of a projective space where z is a variable of a projective space where z is a variable in the z-coordinate;
storing said coordinates $[X_1, Z_1]$ of said projective space;
transforming the coordinate component x2 into coordinates $[X_2, Z_2]$ of said projective space;
storing the projective coordinates $[X_2, Z_2]$;
transforming the coordinate component x4 into coordinates $[X_4, Z_4]$ of said projective space;
storing the coordinates $[X_4, Z_4]$;
determining projective coordinates $[X_3, Z_3]$ from the stored projective coordinates $[X_1, Z_1]$, $[X_2, Z_2]$ and $[X_4, Z_4]$;
transforming the projective coordinates $[X_3, Z_3]$ into said coordinate component x3; and
outputting said coordinate component x3,
whereby scalar multiplication of said point P1(x1, y1) is determined;
generating a random number k;
storing said generated random number k;
transforming the x-coordinates into projective coordinates to thereby derive projective coordinates $[kx, k]$ through arithmetic operation of individual coordinate components of said projective space and said stored random number k.

3. An apparatus implementing an elliptic curve cryptographic operation in a finite field of characteristic 2 (or an extension field of "2"), in which x and y are variables in an x-y coordinate system, a and b are parameters, said elliptic curve is given by $y^2+xy=x^3+ax^2+b$, comprising:

random number generating means for generating a random number k;
projective coordinate transformation means receiving as inputs thereto coordinate x0 of said finite field of characteristic 2 and said random number k, to thereby transform said coordinate x0 into projective coordinates $[kx0, k]=[X_1, Z_{,1}]$;

doubling arithmetic means for arithmetically determining a double point from said projective coordinates $[X_1, Z_1]$;

addition arithmetic means for determining an addition point from said projective coordinate $[X_1, Z_1]$ where Z is a variable in the z-coordinate to thereby output said addition point; and scalar multiplication means receiving, information from said projective coordinate transformation means, said doubling arithmetic means and said addition arithmetic means to thereby perform scalar multiplication of the coordinate component x0.

4. A recording medium storing a program for implementing an elliptic curve cryptographic operation, said recording medium being in a cryptographic apparatus implementing an elliptic curve cryptography in a finite field of characteristic 2 (or an extension field of "2"), in which said elliptic curve is given by $y^2+xy=x^3+ax^2+b$, in which x and y are variables in an x-y coordinate system, a and b are parameters, addition of points P1(x1, y1) and P2(x2, y2) on said elliptic curve composed of points defined by individual coordinate components is presumed to be represented by P3(x3, y3) with subtraction of points P1(x1, y1) and P2(x2, y2) being presumed to be represented by P4, (x4, y4), said program when executed causing the cryptographic apparatus to perform:

inputting an coordinate component x1;

transforming the inputted coordinate component x1 into x- and z-coordinates $[X_1, Z_1]$ in a projective space;

storing said coordinates $[X_2, Z_2]$ of said projective space;

transforming the coordinate component x2 into coordinates $[X_2, Z_2]$ of said projective space;

storing the projective coordinate $[X_1, Z_1]$ where z is a variable in the z-coordinate;

transforming the coordinate component x4 into coordinates $[X_4, Z_4]$ of said projective space;

storing the projective coordinates $[X_4, Z_4]$;

determining projective coordinates $[X_3, Z_3]$ from the stored projective coordinates $[X_1, Z_1]$, $[X_2, Z_2]$ and $[X_4, Z_4]$;

transforming said projective coordinates $[X_3, Z_3]$ into the coordinate component x3; and outputting said coordinate component x3, whereby scalar multiplication of said point P1(x1, y1) is determined;

generating a random number k;

storing said generated random number k;

transforming the x-coordinates into projective coordinates to thereby derive projective coordinates $[k^2x, k]$ through arithmetic operation of individual coordinate components of said projective space and said stored random number k.

5. A recording medium storing a program for implementing an elliptic curve cryptographic operation, said recording medium being in a cryptographic apparatus implementing an elliptic curve cryptography in a finite field of characteristic 2 (or an extension field of "2"), in which said elliptic curve is given by $y^2+xy=x^3+ax^2+b$, in which x and y are variables in an x-y coordinate system, a and b are parameters, addition of points P1(x1, y1) and P2(x2, y2) on said elliptic curve composed of points defined by individual coordinate components is presumed to be represented by P3(x3, y3) with subtraction of points P1(x1, y1) and P2(x2, y2) being presumed to be represented by P4, (x4, y4), said program when executed causing the cryptographic apparatus to perform:

inputting an coordinate component x1;

transforming the inputted coordinate component x1 into x- and z-coordinates $[X_1, Z_1]$ in a projective space:

storing said coordinates $[X_2, Z_2]$ of said projective space;

transforming the coordinate component x2 into coordinates $[X_2, Z_2]$ of said projective space;

storing the projective coordinate $[X_1, Z_1]$ where z is a variable in the z-coordinate;

transforming the coordinate component x4 into coordinates $[X_4, Z_4]$ of said projective space;

storing the projective coordinates $[X_4, Z_4]$;

determining projective coordinates $[X_3, Z_3]$ from the stored projective coordinates $[X_1, Z_1]$, $[X_2, Z_2]$ and $[X_4, Z_4]$;

transforming said projective coordinates $[X_3, Z_3]$ into the coordinate component x3; and outputting said coordinate component x3, whereby scalar multiplication of said point P1(x1, y1) is determined;

generating a random number k;

storing said generated random number k;

transforming the x-coordinates into projective coordinates to thereby derive projective coordinates $[kx, k]$ through arithmetic operation of individual coordinate components of said projective space and said stored random number k.

* * * * *